US012809452B2

(12) United States Patent
Johnson et al.

(10) Patent No.: US 12,809,452 B2
(45) Date of Patent: Nov. 24, 2026

(54) POSTURE-BASED VIRTUAL SPACE CONFIGURATIONS

(71) Applicant: Meta Platforms Technologies, LLC, Menlo Park, CA (US)

(72) Inventors: Samuel Alan Johnson, San Carlos, CA (US); Shaik Shabnam Nizamudeen Basha, Mountain View, CA (US); Mahdi Salmani Rahimi, San Francisco, CA (US); Benjamin Antoine Georges Lefaudeux, Menlo Park, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 19/230,044

(22) Filed: Jun. 5, 2025

(65) Prior Publication Data

US 2025/0370533 A1 Dec. 4, 2025

Related U.S. Application Data

(63) Continuation of application No. 18/623,425, filed on Apr. 1, 2024, now Pat. No. 12,468,379, which is a
(Continued)

(51) Int. Cl.
*G06F 3/01* (2006.01)
*G06T 7/60* (2017.01)
(Continued)

(52) U.S. Cl.
CPC ................ *G06F 3/011* (2013.01); *G06T 7/60* (2013.01); *G06T 19/006* (2013.01); *G06T 19/20* (2013.01);
(Continued)

(58) Field of Classification Search
CPC .......... G06F 3/011; G06F 3/013; G06F 3/017; G06F 3/0346; G06T 7/60; G06T 19/006;
(Continued)

(56) References Cited

U.S. PATENT DOCUMENTS 6,066,954 A 5/2000 Gershenfeld et al.
6,842,175 B1 1/2005 Schmalstieg et al.
(Continued)

FOREIGN PATENT DOCUMENTS

CN 102804206 A 11/2012
CN 104380237 A 2/2015
(Continued)

OTHER PUBLICATIONS

European Search Report for European Application No. 21172954.6, mailed Oct. 29, 2021, 11 pages.
(Continued)

*Primary Examiner* — Vinh T Lam
(74) *Attorney, Agent, or Firm* — Morgan, Lewis & Bockius LLP

(57) ABSTRACT

A virtual space configuration system of an artificial reality system can detect a user posture and provide various corresponding customizations of the system's virtual space. The virtual space configuration system can, when a user is in a seated posture, provide for seated virtual space customizations. In various implementations, these customizations can include allowing adjustment of a floor height; setting a flag that can be surfaced to applications to adjust the applications' mechanics for seated users; customizing display of virtual space boundaries when in seated mode to be less intrusive; providing options to detect when a user leaves seated mode and trigger corresponding actions; provide a passthrough workspace area allowing a user to interact with certain real-world objects naturally without
(Continued)

having to remove a virtual reality headset; or automatically determining virtual space dimensions for seated users.

20 Claims, 15 Drawing Sheets

Related U.S. Application Data continuation of application No. 18/153,035, filed on Jan. 11, 2023, now Pat. No. 11,972,040, which is a continuation of application No. 17/500,383, filed on Oct. 13, 2021, now Pat. No. 11,609,625, which is a continuation of application No. 16/705,872, filed on Dec. 6, 2019, now Pat. No. 11,175,730.

(51) Int. Cl.
*G06T 19/00* (2011.01)
*G06T 19/20* (2011.01)

(52) U.S. Cl.
CPC ............... *G06T 2207/20081* (2013.01); *G06T 2219/2016* (2013.01)

(58) Field of Classification Search
CPC ........... G06T 19/20; G06T 2207/20081; G06T 2219/2016; G06T 2219/2021
See application file for complete search history.

(56) References Cited

U.S. PATENT DOCUMENTS 7,542,040 B2 6/2009 Templeman
7,701,439 B2 4/2010 Hillis et al.
8,493,383 B1 7/2013 Cook et al.
8,558,759 B1 10/2013 Prada Gomez et al.
8,831,794 B2 9/2014 Persaud et al.
8,902,227 B2 12/2014 Harrison
8,947,351 B1 2/2015 Noble
9,052,161 B2 6/2015 Page
9,117,274 B2 8/2015 Liao et al.
9,158,389 B1 10/2015 Sharma et al.
9,159,140 B2 10/2015 Hoof et al.
9,292,089 B1 3/2016 Sadek
9,342,230 B2 5/2016 Bastien et al.
9,412,010 B2 8/2016 Kawaguchi et al.
9,477,368 B1 10/2016 Filip et al.
9,526,983 B2 12/2016 Lin
9,619,712 B2 4/2017 Mullins et al.
9,811,721 B2 11/2017 Tang et al.
9,817,472 B2 11/2017 Lee et al.
9,818,231 B2 11/2017 Coffey et al.
9,821,224 B2 11/2017 Latta et al.
9,830,395 B2 11/2017 Mullins et al.
9,864,910 B2 1/2018 Mullins et al.
9,886,096 B2 2/2018 Kang et al.
9,910,506 B2 3/2018 Spießl et al.
9,940,750 B2 4/2018 Dillavou et al.
10,019,131 B2 7/2018 Welker et al.
10,026,231 B1 7/2018 Gribetz et al.
10,043,279 B1 8/2018 Eshet
10,048,760 B2 8/2018 Abercrombie
10,067,559 B2 9/2018 Wheeler et al.
10,067,636 B2 9/2018 Palmaro
10,102,676 B2 10/2018 Yajima et al.
10,133,342 B2 11/2018 Mittal et al.
10,163,001 B2 12/2018 Kim et al.
10,168,873 B1 1/2019 Holz et al.
10,181,218 B1 1/2019 Goetzinger, Jr. et al.
10,220,303 B1 3/2019 Schmidt et al.
10,235,807 B2 3/2019 Thomas et al.
10,248,284 B2 4/2019 Itani et al.
10,303,259 B2 5/2019 Brunner et al.
10,325,184 B2 6/2019 Brunner et al.
10,339,721 B1 7/2019 Dascola et al.
10,387,719 B2 8/2019 Hutka et al.
10,416,837 B2 9/2019 Reif
10,423,241 B1 9/2019 Pham et al.
10,451,875 B2 10/2019 Sutherland et al.
10,473,935 B1 11/2019 Gribetz et al.
10,481,755 B1 11/2019 Ngo et al.
10,521,944 B2 * 12/2019 Sareen .................... G06F 3/011
10,535,199 B1 1/2020 Bond et al.
10,558,048 B2 2/2020 Fukuda et al.
10,592,067 B2 3/2020 Merdan et al.
10,617,956 B2 4/2020 Black et al.
10,621,784 B2 4/2020 Khan et al.
10,649,212 B2 5/2020 Burns et al.
10,657,694 B2 5/2020 Sharma et al.
10,726,266 B2 7/2020 Sharma et al.
10,802,582 B1 10/2020 Clements
10,802,600 B1 10/2020 Ravasz et al.
10,803,314 B2 10/2020 Tian et al.
10,818,071 B1 10/2020 Hoppe et al.
10,818,088 B2 10/2020 Jones et al.
10,824,247 B1 11/2020 Henrikson et al.
10,838,574 B2 11/2020 Agarawala et al.
10,852,814 B1 * 12/2020 Caron ................... G06T 19/006
10,859,831 B1 12/2020 Pollard et al.
10,890,653 B2 1/2021 Giusti et al.
10,890,967 B2 1/2021 Stellmach et al.
10,901,215 B1 1/2021 Newcombe et al.
10,921,878 B2 2/2021 Noris et al.
10,922,894 B2 2/2021 Sculli et al.
10,943,388 B1 3/2021 Hosenpud et al.
10,970,936 B2 4/2021 Osborn et al.
11,019,283 B2 5/2021 Carter et al.
11,030,237 B2 6/2021 Itani et al.
11,030,788 B2 6/2021 Grant
11,073,902 B1 7/2021 Rahimi et al.
11,077,360 B2 8/2021 Ohashi
11,093,103 B2 8/2021 Agarawala et al.
11,099,638 B2 8/2021 Johnson et al.
11,163,417 B2 11/2021 Hauenstein et al.
11,170,576 B2 11/2021 Ravasz et al.
11,175,730 B2 11/2021 Johnson et al.
11,176,745 B2 11/2021 Ravasz et al.
11,178,376 B1 11/2021 Tichenor et al.
11,189,099 B2 11/2021 Ravasz et al.
11,195,320 B2 12/2021 Lin et al.
11,244,483 B2 2/2022 Pollard et al.
11,256,336 B2 2/2022 Schoen
11,257,280 B1 2/2022 Pedrotti et al.
11,294,475 B1 4/2022 Pinchon et al.
11,409,402 B1 8/2022 Cole et al.
11,416,201 B2 8/2022 Leppänen et al.
11,474,610 B2 10/2022 Lee
11,609,625 B2 3/2023 Johnson et al.
11,625,103 B2 4/2023 Schoen
11,637,999 B1 4/2023 Tichenor et al.
11,741,649 B2 8/2023 Pollard et al.
11,809,617 B2 11/2023 Johnson et al.
11,972,040 B2 4/2024 Johnson et al.
11,989,838 B2 5/2024 Kawamae et al.
12,130,967 B2 10/2024 Schoen
2004/0224670 A1 11/2004 Hull et al.
2007/0003915 A1 1/2007 Templeman
2008/0089587 A1 4/2008 Kim et al.
2010/0306716 A1 12/2010 Perez
2011/0009241 A1 1/2011 Lane et al.
2011/0032257 A1 2/2011 Peterson et al.
2011/0154266 A1 6/2011 Friend et al.
2011/0254846 A1 10/2011 Lee et al.
2011/0267265 A1 11/2011 Stinson
2011/0310220 A1 12/2011 McEldowney
2012/0069168 A1 3/2012 Huang et al.
2012/0143358 A1 6/2012 Adams et al.
2012/0157198 A1 6/2012 Latta et al.
2012/0188279 A1 7/2012 Demaine
2012/0206345 A1 8/2012 Langridge
2012/0256967 A1 10/2012 Baldwin et al.
2012/0275686 A1 11/2012 Wilson et al.
2012/0293544 A1 11/2012 Miyamoto et al.
2012/0324213 A1 12/2012 Ho et al.

(56) References Cited

U.S. PATENT DOCUMENTS

2013/0002551 A1 1/2013 Imoto et al.
2013/0022843 A1 1/2013 Tohda
2013/0026220 A1 1/2013 Whelihan
2013/0042296 A1 2/2013 Hastings et al.
2013/0063345 A1 3/2013 Maeda
2013/0125066 A1 5/2013 Klein et al.
2013/0147793 A1 6/2013 Jeon et al.
2013/0211843 A1 8/2013 Clarkson
2013/0265220 A1 10/2013 Fleischmann et al.
2014/0125598 A1 5/2014 Cheng et al.
2014/0168217 A1 6/2014 Kim et al.
2014/0201666 A1 7/2014 Bedikian et al.
2014/0236996 A1 8/2014 Masuko et al.
2014/0357366 A1 12/2014 Koganezawa et al.
2014/0375691 A1 12/2014 Kasahara
2015/0009238 A1 1/2015 Kudalkar
2015/0035746 A1 2/2015 Cockburn et al.
2015/0054742 A1 2/2015 Imoto et al.
2015/0061998 A1 3/2015 Yang et al.
2015/0062160 A1 3/2015 Sakamoto et al.
2015/0062162 A1 3/2015 Kim et al.
2015/0153833 A1 6/2015 Pinault et al.
2015/0160736 A1 6/2015 Fujiwara
2015/0169076 A1 6/2015 Cohen et al.
2015/0176998 A1 6/2015 Huang et al.
2015/0181679 A1 6/2015 Liao et al.
2015/0206321 A1 7/2015 Scavezze et al.
2015/0220150 A1 8/2015 Plagemann et al.
2015/0260474 A1 9/2015 Rublowsky et al.
2015/0261659 A1 9/2015 Bader et al.
2015/0317831 A1 11/2015 Ebstyne et al.
2015/0331576 A1* 11/2015 Piya .................... G06F 3/04815
715/850
2016/0027212 A1 1/2016 Da Veiga et al.
2016/0027213 A1 1/2016 Burns et al.
2016/0110052 A1 4/2016 Kim et al.
2016/0147308 A1 5/2016 Gelman et al.
2016/0170603 A1 6/2016 Bastien et al.
2016/0171771 A1 6/2016 Pedrotti et al.
2016/0210784 A1 7/2016 Ramsby et al.
2016/0231810 A1 8/2016 Imoto et al.
2016/0266386 A1 9/2016 Scott et al.
2016/0378291 A1 12/2016 Pokrzywka
2017/0060230 A1 3/2017 Faaborg et al.
2017/0060319 A1 3/2017 Seo et al.
2017/0109936 A1 4/2017 Powderly et al.
2017/0123487 A1 5/2017 Hazra et al.
2017/0139472 A1* 5/2017 Basile, Jr. ............... G06F 3/011
2017/0139478 A1 5/2017 Jeon et al.
2017/0147078 A1 5/2017 Van Laack et al.
2017/0154467 A1 6/2017 Hu
2017/0192513 A1 7/2017 Karmon et al.
2017/0203213 A1 7/2017 Stafford
2017/0205892 A1 7/2017 Petrovskaya et al.
2017/0236320 A1 8/2017 Gribetz et al.
2017/0237789 A1 8/2017 Harner et al.
2017/0243401 A1 8/2017 Tanaka et al.
2017/0262063 A1 9/2017 Blénessy et al.
2017/0278304 A1 9/2017 Hildreth et al.
2017/0287225 A1 10/2017 Powderly et al.
2017/0296363 A1 10/2017 Yetkin et al.
2017/0364198 A1 12/2017 Yoganandan et al.
2017/0372499 A1 12/2017 Lalonde
2018/0003982 A1 1/2018 Burns et al.
2018/0005443 A1 1/2018 Poulos et al.
2018/0024623 A1 1/2018 Faaborg et al.
2018/0059901 A1 3/2018 Gullicksen
2018/0095635 A1 4/2018 Valdivia et al.
2018/0107278 A1 4/2018 Goel et al.
2018/0113599 A1 4/2018 Yin
2018/0144556 A1 5/2018 Champion et al.
2018/0164982 A1* 6/2018 Rakshit ............... G06F 3/04815
2018/0190022 A1 7/2018 Zamir et al.
2018/0224928 A1 8/2018 Ross et al.
2018/0307303 A1 10/2018 Powderly et al.
2018/0310116 A1 10/2018 Arteaga et al.
2018/0322701 A1 11/2018 Pahud et al.
2018/0335925 A1 11/2018 Hsiao et al.
2018/0349690 A1 12/2018 Rhee et al.
2018/0357780 A1 12/2018 Young et al.
2019/0033989 A1 1/2019 Wang et al.
2019/0043259 A1 2/2019 Wang et al.
2019/0050062 A1 2/2019 Chen et al.
2019/0094981 A1 3/2019 Bradski et al.
2019/0097981 A1 3/2019 Koyun et al.
2019/0102927 A1* 4/2019 Yokokawa .............. G06F 3/017
2019/0102941 A1 4/2019 Khan et al.
2019/0107894 A1 4/2019 Hebbalaguppe et al.
2019/0130655 A1 5/2019 Gupta et al.
2019/0188895 A1 6/2019 Miller, IV et al.
2019/0196577 A1 6/2019 Sronipah et al.
2019/0213792 A1 7/2019 Jakubzak et al.
2019/0258318 A1 8/2019 Qin et al.
2019/0278376 A1 9/2019 Kutliroff et al.
2019/0279424 A1 9/2019 Clausen et al.
2019/0286231 A1 9/2019 Burns et al.
2019/0310757 A1 10/2019 Lee et al.
2019/0317596 A1 10/2019 Sato
2019/0320138 A1 10/2019 Kaufthal
2019/0340818 A1 11/2019 Furtwangler
2019/0355272 A1 11/2019 Nusbaum et al.
2019/0362557 A1 11/2019 Lacey et al.
2019/0362562 A1 11/2019 Benson
2019/0369391 A1 12/2019 Cordesses et al.
2019/0377416 A1 12/2019 Alexander
2020/0001461 A1 1/2020 Cappello et al.
2020/0012341 A1* 1/2020 Stellmach ............... G06F 3/017
2020/0020161 A1* 1/2020 Jones .................... G06F 3/0346
2020/0033957 A1 1/2020 Bieglmayer
2020/0064908 A1 2/2020 Boucher
2020/0082629 A1 3/2020 Jones et al.
2020/0097077 A1* 3/2020 Nguyen ........... G05B 19/41885
2020/0097091 A1 3/2020 Chou et al.
2020/0103521 A1 4/2020 Chiarella et al.
2020/0103963 A1 4/2020 Kelly et al.
2020/0134895 A1 4/2020 Pollard et al.
2020/0143598 A1 5/2020 Riordan
2020/0209949 A1 7/2020 Noris et al.
2020/0210137 A1 7/2020 Noris et al.
2020/0218423 A1 7/2020 Ohashi
2020/0225736 A1 7/2020 Schwarz et al.
2020/0225758 A1 7/2020 Tang et al.
2020/0225830 A1* 7/2020 Tang ....................... G06F 3/011
2020/0226814 A1 7/2020 Tang et al.
2020/0241646 A1 7/2020 Hebbalaguppe et al.
2020/0249746 A1 8/2020 Gkaintatzis
2020/0272231 A1 8/2020 Klein et al.
2020/0379576 A1 12/2020 Chen et al.
2021/0012113 A1 1/2021 Petill et al.
2021/0072817 A1 3/2021 Bond et al.
2021/0090331 A1 3/2021 Ravasz et al.
2021/0090333 A1 3/2021 Ravasz et al.
2021/0090337 A1 3/2021 Ravasz et al.
2022/0130100 A1 4/2022 Pedrotti et al.
2022/0358715 A1 11/2022 Tanner et al.
2023/0188533 A1 6/2023 LeBeau et al.
2023/0244321 A1 8/2023 Schoen
2023/0325046 A1 10/2023 De Almeida E De Vincenzo et al.
2025/0068291 A1 2/2025 De Almeida E De Vincenzo et al.

FOREIGN PATENT DOCUMENTS

CN 106575155 A 4/2017
CN 107533374 A 1/2018
CN 206961066 U 2/2018
CN 107992189 A 5/2018
CN 108292040 A 7/2018
CN 109478101 A 3/2019
JP 2009037434 A 2/2009
JP 2014099184 A 5/2014
JP 2017201524 A 11/2017
JP 2018516422 A 6/2018

(56) References Cited

FOREIGN PATENT DOCUMENTS

| | | | |
|---|---|---|---|
| JP | 2018198075 | A | 12/2018 |
| JP | 2019517049 | A | 6/2019 |
| JP | 2019533846 | A | 11/2019 |
| KR | 20110057921 | A | 6/2011 |
| KR | 20180124136 | A | 11/2018 |
| WO | 2017104525 | A1 | 6/2017 |
| WO | 2018235371 | A1 | 12/2018 |

OTHER PUBLICATIONS

Extended European Search Report for European Patent Application No. 25168972.5, dated Jun. 26, 2025, 8 pages.
Hincapie-Ramos J.D., et al., "GyroWand: IMU-Based Raycasting for Augmented Reality Head-Mounted Displays," Proceedings of the 3rd Association for Computing Machinery (ACM) Symposium on Spatial User Interaction, Los Angeles, CA, USA, Aug. 8-9, 2015, pp. 89-98.
International Preliminary Report on Patentability for International Application No. PCT/US2020/058648, mailed Jun. 16, 2022, 10 pages.
International Search Report and Written Opinion for International Application No. PCT/US2020/051763, mailed Feb. 3, 2021, 11 Pages.
International Search Report and Written Opinion for International Application No. PCT/US2020/052976, mailed Dec. 11, 2020, 10 Pages.
International Search Report and Written Opinion for International Application No. PCT/US2020/058648, mailed Feb. 23, 2021, 12 Pages.
International Search Report and Written Opinion for International Application No. PCT/US2021/038826, mailed Oct. 19, 2021, 12 pages.
Katz N., et al., "Extending Web Browsers with a Unity 3D-Based Virtual Worlds Viewer," IEEE Computer Society, Sep./Oct. 2011, vol. 15 (5), pp. 15-21.
Mayer S., et al., "The Effect of Offset Correction and Cursor on Mid-Air Pointing in Real and Virtual Environments," Proceedings of the 2018 CHI Conference on Human Factors in Computing Systems, Montreal, QC, Canada, Apr. 21-26, 2018, pp. 1-13.
Non-Final Office Action mailed May 7, 2025 for U.S. Appl. No. 18/884,475, filed Sep. 13, 2024, 10 pages.
Notice of Allowance mailed Aug. 1, 2025 for U.S. Appl. No. 18/623,425, filed Apr. 1, 2024, 2 pages.
Notice of Allowance mailed Aug. 11, 2025 for U.S. Appl. No. 18/623,425, filed Apr. 1, 2024, 2 pages.
Notice of Allowance mailed Jul. 15, 2025 for U.S. Appl. No. 18/623,425, filed Apr. 1, 2024, 9 pages.
Office Action mailed Jul. 2, 2025 for Chinese Application No. 202080081235.1, filed Nov. 3, 2020, 12 pages.
Office Action mailed Aug. 7, 2025 for European Patent Application No. 21742998.4, filed on Jun. 24, 2021, 8 pages.
Office Action mailed Jan. 14, 2025 for Japanese Patent Application No. 2021-088901, filed on May 27, 2021, 4 pages.
Office Action mailed Jan. 16, 2025 for Chinese Application No. 202080081235.1, filed Nov. 3, 2020, 16 pages.
Office Action mailed Aug. 19, 2025 for Japanese Application No. 2022-579982, filed on Jun. 24, 2021, 3 pages.
Office Action mailed Oct. 20, 2025 for Korean Application No. 10-2021-0067565, filed May 26, 2021, 5 pages.
Office Action mailed Mar. 25, 2025 for Japanese Application No. 2022-579982, filed on Jun. 24, 2021, 4 pages.
Office Action mailed Jul. 27, 2025 for Korean Application No. 10-2023-7002566, filed Jun. 24, 2021, 14 pages.
Office Action mailed Sep. 30, 2025 for Korean Application No. 10-2022-7023045, filed Nov. 3, 2020, 12 pages.
Olwal A., et al., "The Flexible Pointer: An Interaction Technique for Selection in Augmented and Virtual Reality," Proceedings of ACM Symposium on User Interface Software and Technology (UIST), Vancouver, BC, Nov. 2-5, 2003, pp. 81-82.
Qiao X., et al., "Web AR: A Promising Future for Mobile Augmented Reality—State of the Art. Challenges, and Insights," Proceedings of the IEEE, Apr. 2019, vol. 107 (4), pp. 651-666.
Renner P., et al., "Ray Casting", Central Facility Labs [Online], [Retrieved on Apr. 7, 2020], 2 pages, Retrieved from the Internet: URL:https://www.techfak.uni-bielefeld.de/~tpfeiffe/lehre/VirtualReality/interaction/ray_casting.html.
Schweigert R., et al., "EyePointing: A Gaze-Based Selection Technique," Proceedings of Mensch and Computer, Hamburg, Germany, Sep. 8-11, 2019, pp. 719-723.
Srinivasa R.R., "Augmented Reality Adaptive Web Content," 13th IEEE Annual Consumer Communications & Networking Conference (CCNC), 2016, pp. 1-4.
Unity Gets Toolkit for Common AR/VR Interactions, Unity XR interaction Toolkit Preview [Online], Dec. 19, 2019 Retrieved on Apr. 7, 2020], 1 page, Retrieved from the Internet: URL: http://youtu.be/ZPhv4qmT9EQ.
Office Action mailed Apr. 14, 2026 for Korean Application No. 10-2022-7023045, filed Nov. 3, 2020, 10 pages.
Office Action mailed Apr. 27, 2026 for Korean Application No. 10-2023-7002566, filed Jun. 24, 2021, 7 pages.
Long Q., et al., "Technical Note: Towards Virtual Monitors for Image Guided Interventions Real-Time Streaming to Optical See-Through Head-Monuted Displays," Oct. 3, 2017, 6 pages, Reterived from the Internet URL: https://arxiv.org/abs/1710.00808v1.
Notice of Allowance mailed Mar. 3, 2026 for U.S. Appl. No. 18/884,475, filed Sep. 13, 2024, 9 pages.
Office Action mailed Mar. 13, 2026 for Chinese Application No. 202180053780.4, filed Jun. 24, 2021, 11 pages.
Extended European Search Report for European Patent Application No. 25217752.2, dated Mar. 4, 2026, 12 pages.
Office Action mailed Nov. 17, 2025 for Chinese Application No. 202180053780.4, filed Jun. 24, 2021, 11 pages.
Office Action mailed Nov. 26, 2025 for Chinese Application No. 202080081235.1, filed Nov. 3, 2020, 2 pages.

* cited by examiner

POSTURE-BASED VIRTUAL SPACE CONFIGURATIONS

CROSS-REFERENCE TO RELATED APPLICATIONS

This application is a continuation of U.S. application Ser. No. 18/623,425, filed Apr. 1, 2024, titled "Posture-Based Virtual Space Configurations", currently pending, which is a continuation of U.S. application Ser. No. 18/153,035, filed on Jan. 11, 2023, titled "Posture-Based Virtual Space Configurations," now issued as U.S. Pat. No. 11,972,040 on Apr. 30, 2024, which is a continuation of U.S. application Ser. No. 17/500,383, filed Oct. 13, 2021, titled "Posture-Based Virtual Space Configurations," now issued as U.S. Pat. No. 11,609,625 on Mar. 21, 2023, which is a continuation of U.S. application Ser. No. 16/705,872, filed Dec. 6, 2019, titled "Posture-Based Virtual Space Configurations", now U.S. Pat. No. 11,175,730 issued on Nov. 16, 2021, all of which are incorporated by reference in their entirety.

TECHNICAL FIELD

The present disclosure is directed to controlling configurations of a virtual space for an artificial reality environment.

BACKGROUND

While a user is seeing and interacting with "virtual objects," i.e., computer-generated object representations appearing in an artificial reality environment, the user's physical movements occur in the real world. In some cases, an artificial reality system can prevent the user from seeing part or all of the real world or the user can become distracted by the virtual objects, causing the user to inadvertently collide with real-world objects or exit an area designated for the user to interact in the artificial reality environment. In other cases, the user's movement may be restricted by the user's physical posture in the real world, causing some difficulty interacting in the artificial reality environment. For example, some virtual objects may be placed out of reach, making it difficult for the user to interact with them from the user's current posture.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
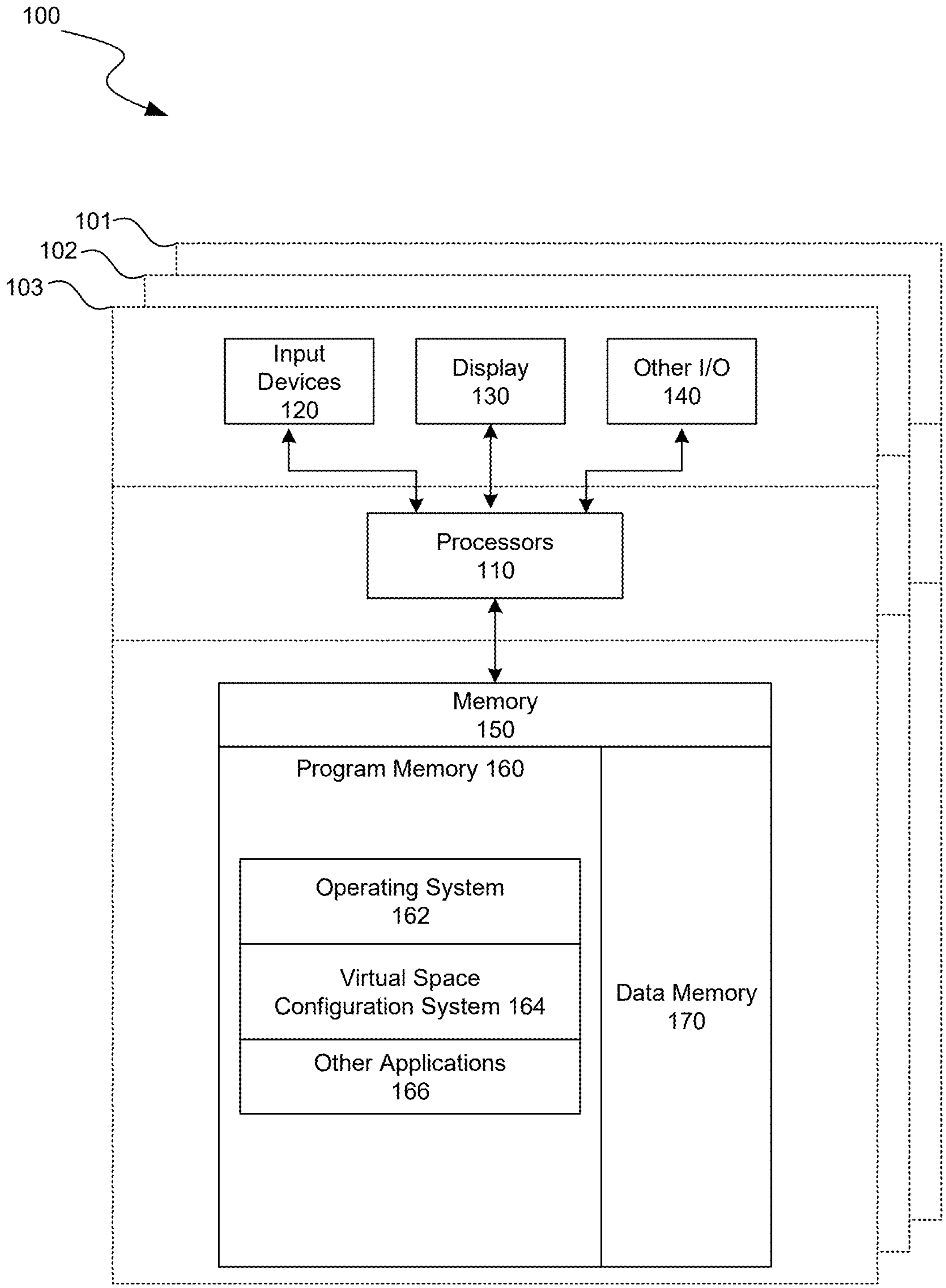
FIG. 1 is a block diagram illustrating an overview of devices on which some implementations of the present technology can operate.

Embodiments for customizing a virtual space based on user posture are described herein. Artificial reality systems can define a particular "virtual space" for a user experience, which can define the user's range of movement during the experience, control how virtual objects are displayed or placed in the experience, and/or set system actions in response to a posture change. For example, if a user approaches the edge of the defined virtual space, the artificial reality system can provide a warning or enable a passthrough mode showing the user real-world objects with which she might collide. As used herein, a "posture" is a position or configuration of one or more parts of a user's body. For example, a posture can be seated, standing, lying down, having arms outstretched, a particular hand position or gesture, a head orientation, a torso rotation, etc. In some implementations, a posture can also encompass movement, such as a particular motion of one or more body parts and/or in relation to a point or object. For example, a first identified posture can be standing stationary while a second identified posture can be standing mobile (e.g., the user has made threshold lateral movements relative to a central point).

A virtual space configuration system, which can be a sub-system of an artificial reality system, can detect a user posture and provide various corresponding customizations of the system's virtual space. In some implementations, postures that the virtual space configuration system can identify include standing (which can be divided into standing mobile or standing stationary), seated, lying down, etc. In various implementations, these determinations can be automatic, based on a user input, or automatically determined and user-confirmed. For example, the virtual space configuration system can determine the height of a headset of the artificial reality system, as compared to an identified floor, and using a known user height or average of height of multiple users, can determine whether the headset height corresponds to a standing or sitting position. In addition, when the position is determined as standing, the virtual space configuration system can determine whether a lateral position of the headset has moved above a threshold amount from a central point to determine whether the standing user is stationary or mobile. The virtual space configuration system can provide an indication of the determined posture to the user for the user to confirm or modify.

When in a standing mobile posture, the virtual space configuration system can set a virtual space that the user has defined for the current real-world environment of the artificial reality system and/or the virtual space configuration system can automatically detect objects around the user's current location and set the virtual space to avoid collisions with those objects. When a user approaches this boundary, the virtual space configuration system can present a warning or display a grid indicating the border. When in a standing stationary posture, the virtual space configuration system can define a virtual space around the user, e.g., as a cylindrical area or a "wineglass" shape (i.e., a cylinder that is narrow at the bottom and wider at the top) that accounts for the user's legs being stationary but provides a space around the upper portion of user in which to move her arms. In some implementations, the diameter of this cylinder or the upper part of the wineglass shape can be based on characteristics of the user, such as a determined arm-span.

When the user is determined to be in a seated or lying down mode, the virtual space configuration system can provide various other virtual space customizations. In one instance, the virtual space configuration system can obtain metrics for a different floor height to use when a user is seated. These metrics can be from, for example, a machine learning model trained to predict a desired floor height, user input specifying a floor height change (e.g., using a controller, a gesture, or a tracked user gaze), and/or past floor height settings from the user or users determined to have similar characteristics. The virtual space configuration system can then set the floor height based on the metrics. This sets a minimum height for virtual objects in relation to the user, improving user accessibility when in the virtual space by eliminating instances where the user would otherwise have to move to the edge of a chair or couch and reach the floor.

In another instance, the virtual space configuration system can facilitate adjustments for application mechanics specific to a seated or lying down user. For example, a notified application can adjust virtual object placement to be within a typical or measured user arm-span when the user is seated or lying down. For example, virtual objects that a user would normally take a step to interact with can be automatically moved within reach. This can be in response to a flag that the virtual space configuration system sets for seated and/or lying down modes, which can in turn be surfaced to applications. The applications can be customized to have different mechanics based on such flags.

In another case, the virtual space configuration system can configure a boundary mode based on the user's posture. In one case, when the user is in a standing posture, the virtual space can have set boundaries and the virtual space configuration system will display the boundary or a warning when the virtual space configuration system predicts that the user may connect with the boundary. For example, when the user is in a standing posture, the boundary can be a red grid, which will immediately catch the user's attention if it is displayed in the virtual space. However, because the user is likely to be moving more slowly or only moving her arms, collisions with the boundary when seated are less likely to be a problem. Thus, the boundary when seated can be a much less intrusive pattern, such as a pattern of small gray cross (e.g., +) marks. Alternatively, instead of displaying a boundary when seated, the system can identify real-world objects around the user and display them in the virtual space when the virtual space configuration system predicts the user may collide with them (e.g., when they are within an arm-span of the user).

In yet another instance, the virtual space configuration system can enable experiences that are available only when the user is in a particular posture or that trigger a particular action when the user transitions between postures. For example, after determining that the user is in a seated posture, the artificial reality system can initiate a "seated-only" experience. The virtual space configuration system can continuously monitor the user's posture throughout the experience. If the user stands up, this can trigger the artificial reality system to take an action such as automatically stopping the seated-only experience, providing a notification to the user to return to a seated position, logging times the user was standing during the experience, switching to pass-through mode where aspects of the real world are displayed instead of parts of the experience, and/or changing aspects of the experience such as providing a different input modality or changing virtual objects.

Further, the virtual space configuration system can provide a "workspace" virtual area that appears when the user is seated and is also in a particular additional posture, such as leaning forward. The workspace can be an area in front of the user, e.g., based on one or more of a determined user arm-span, general user arm-length statistics, a previous user setting, a user drawn area, and/or an identification of an area that includes particular objects (e.g., a keyboard, monitors, a mouse, a desk area, etc.). The virtual space configuration system can further detect that the user, while seated, leaned forward at least a threshold amount. In some implementations, this can also be contingent upon identifying a flat workspace (such as a desk) in front of the user. Upon making this further posture determination, the virtual space configuration system can enable a passthrough mode i.e., a mode that shows a representation at least part of the real world, in this case the determined workspace area. This allows the user to quickly and easily transition between interacting with real-world items in the workspace area and virtual objects in the virtual space.

In another case, the virtual space configuration system can automatically customize dimensions (e.g., size and/or shape) of the virtual area for seated mode. The virtual space configuration system can determine the dimensions based on context or user specifics such as a determined user arm-span, statistics of average or determined similar users, previous user settings, a user drawn area, or by identifying objects in the surrounding area. The virtual space configuration system can then set the virtual area based on the determined dimensions, e.g., as a rectangle or semicircle in front of the user or a full circle around the user.

Embodiments of the disclosed technology may include or be implemented in conjunction with an artificial reality system. Artificial reality or extra reality (XR) is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

There are existing XR systems that provide virtual spaces. However, these XR systems can be difficult to use and provide limited functionality. Existing XR systems often do not distinguish between user postures when configuring a virtual space, requiring the user to manually adjust the virtual space or necessitating that the user operate in a virtual space that may be difficult to use, distracting, or not allow certain options. For example, when a user is seated, standard XR systems do not provide an option to adjust the floor location, often requiring the user to move off their seat to reach virtual objects placed on the floor. As another example, existing XR systems generally have a single warning system for when a user is about to collide with a virtual space wall. However, this can be distracting and unnecessary when the user is seated as such collisions are less likely to cause any damage. Further, existing XR systems require extensive setup for virtual spaces, which may be unnecessary for a seated configuration where the virtual space is likely to be smaller and less likely to need specific contours.

The virtual space configuration systems and processes described herein are expected to overcome such problems associated with conventional XR systems and are expected to provide users with greater control over the virtual spaces. The disclosed virtual space configuration systems and processes are also expected to offer more functionality, and a more natural and intuitive user experience than interactions in existing XR systems. Despite being natural and intuitive, the virtual space configuration systems and processes described herein are rooted in computerized artificial reality systems instead of being an analog of traditional interactions. For example, these virtual space configuration systems and processes can determine when a user is seated and, in response, provide for virtual space customizations. One such virtual space customization can be allowing adjustment of a floor height. Another virtual space customization can be setting a flag that can be surfaced to applications to adjust the applications' mechanics. Further a virtual space customization can be customizing a display of seated-mode virtual space boundaries to be less intrusive. Yet a further virtual space customization can be providing options to detect when a user leaves seated mode and trigger corresponding actions. Another virtual space customization can be providing a passthrough workspace area allowing a user to interact with certain real-world objects naturally without having to remove a virtual reality headset. And another virtual space customization can be automatically determining virtual space dimensions for seated users.

Several implementations are discussed below in more detail in reference to the figures. FIG. 1 is a block diagram illustrating an overview of devices on which some implementations of the disclosed technology can operate. The devices can comprise hardware components of a computing system 100 that can determine a user posture and set corresponding virtual space customizations. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, virtual space configurations system 164, and other application programs 166. Memory 150 can also include data memory 170 that can include various models (e.g., posture classifiers, boundary collision predictors, user height or arm-span identifiers, etc.), floor height settings, seated flag variables, boundary mode variables and associated display configurations, posture change mappings, virtual experiences, workspace area settings, virtual area settings, other configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
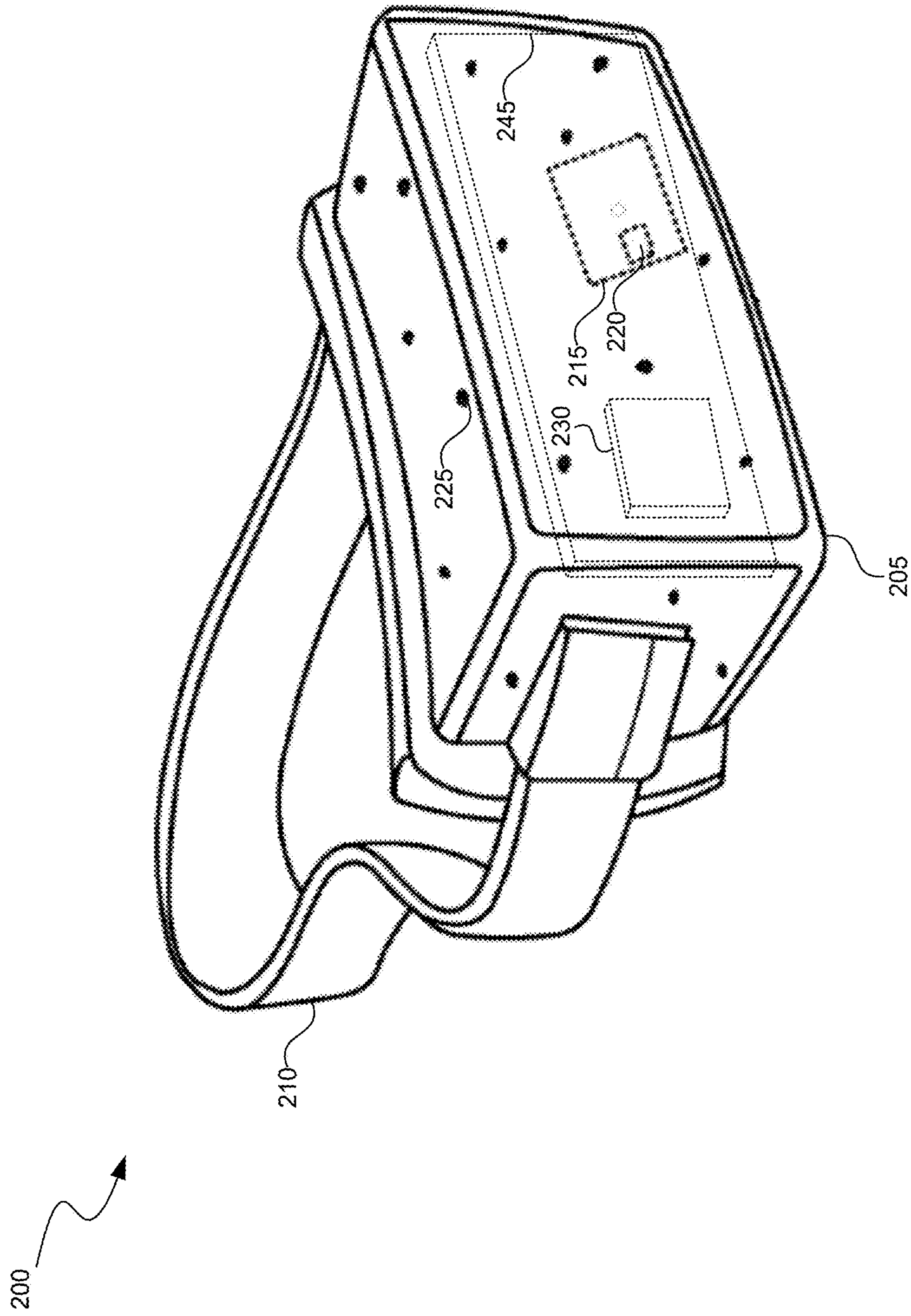
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3 DoF) or six degrees of freedom (6 DoF). For example, the locators 225 can emit infrared light beams which create light points on real objects around the HMD 200. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

In some implementations, the HMD 200 can be in communication with one or more other external devices, such as controllers (not shown) which a user can hold in one or both hands. The controllers can have their own IMU units, position sensors, and/or can emit further light points. The HMD 200 or external sensors can track these controller light points. The compute units 230 in the HMD 200 or the core processing component can use this tracking, in combination with IMU and position output, to monitor hand positions and motions of the user. The controllers can also include various buttons a user can actuate to provide input and interact with virtual objects. In various implementations, the HMD 200 can also include additional subsystems, such as an eye tracking unit, an audio system, various network components, etc. In some implementations, instead of or in addition to controllers, one or more cameras included in the HMD 200 or external to it can monitor the positions and poses of the user's hands to determine gestures and other hand and body motions.

Figure 2B:
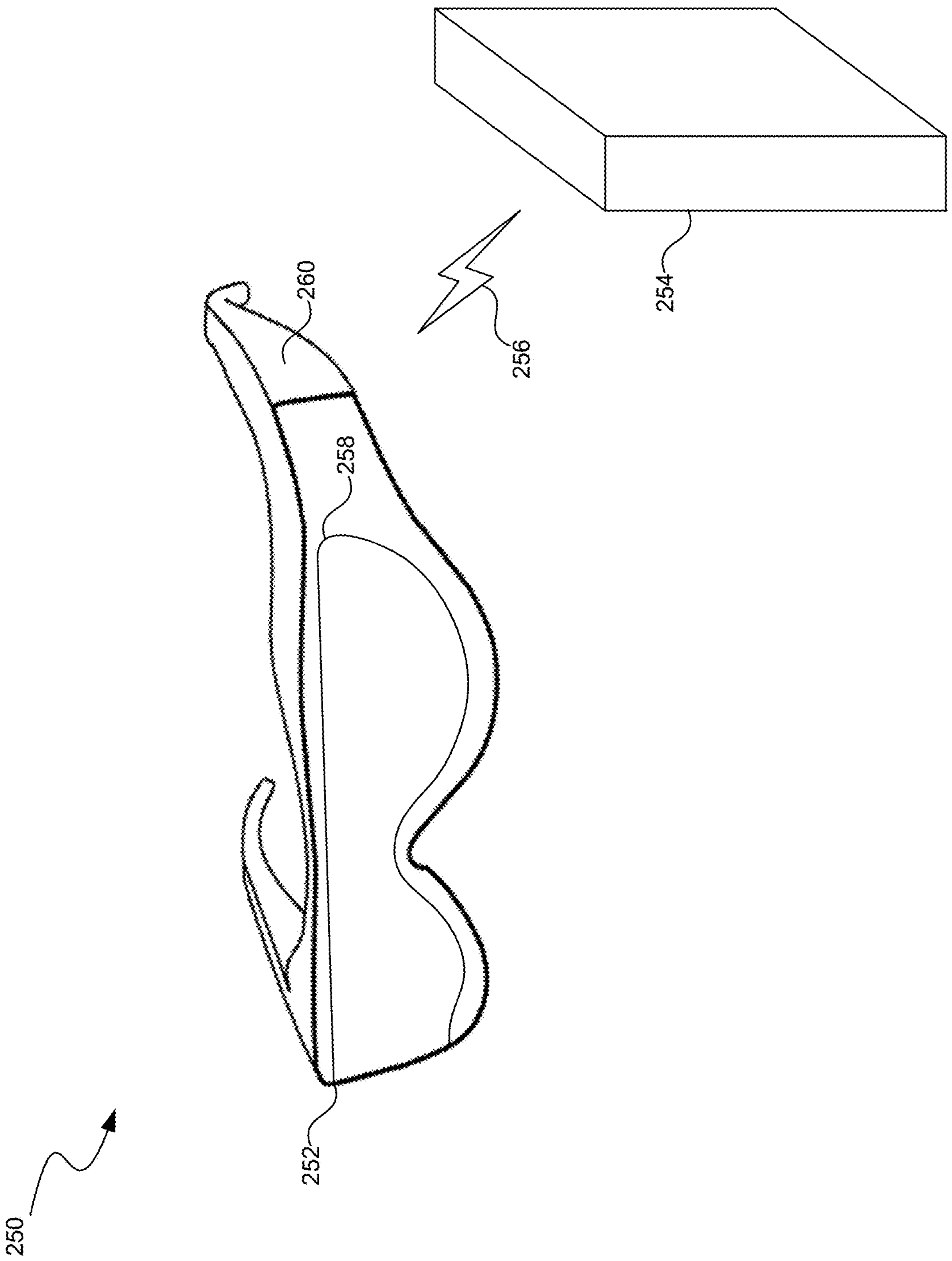
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERS, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3 DoF or 6 DoF, track portions of the user (e.g., hands, feet, head, or other body parts), map virtual objects to appear as stationary as the HMD 252 moves, and have virtual objects react to gestures and other real-world objects.

Figure 3:
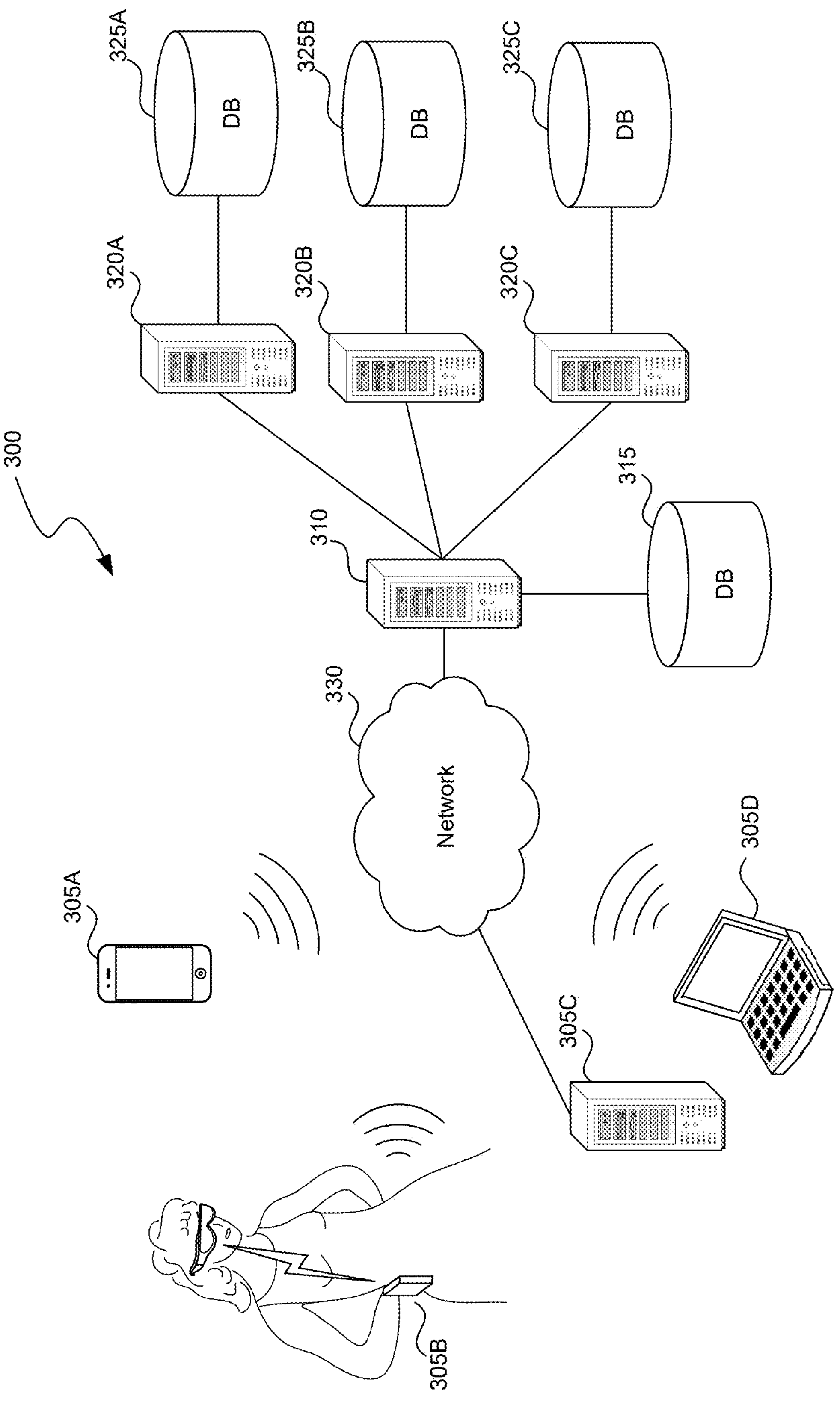
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
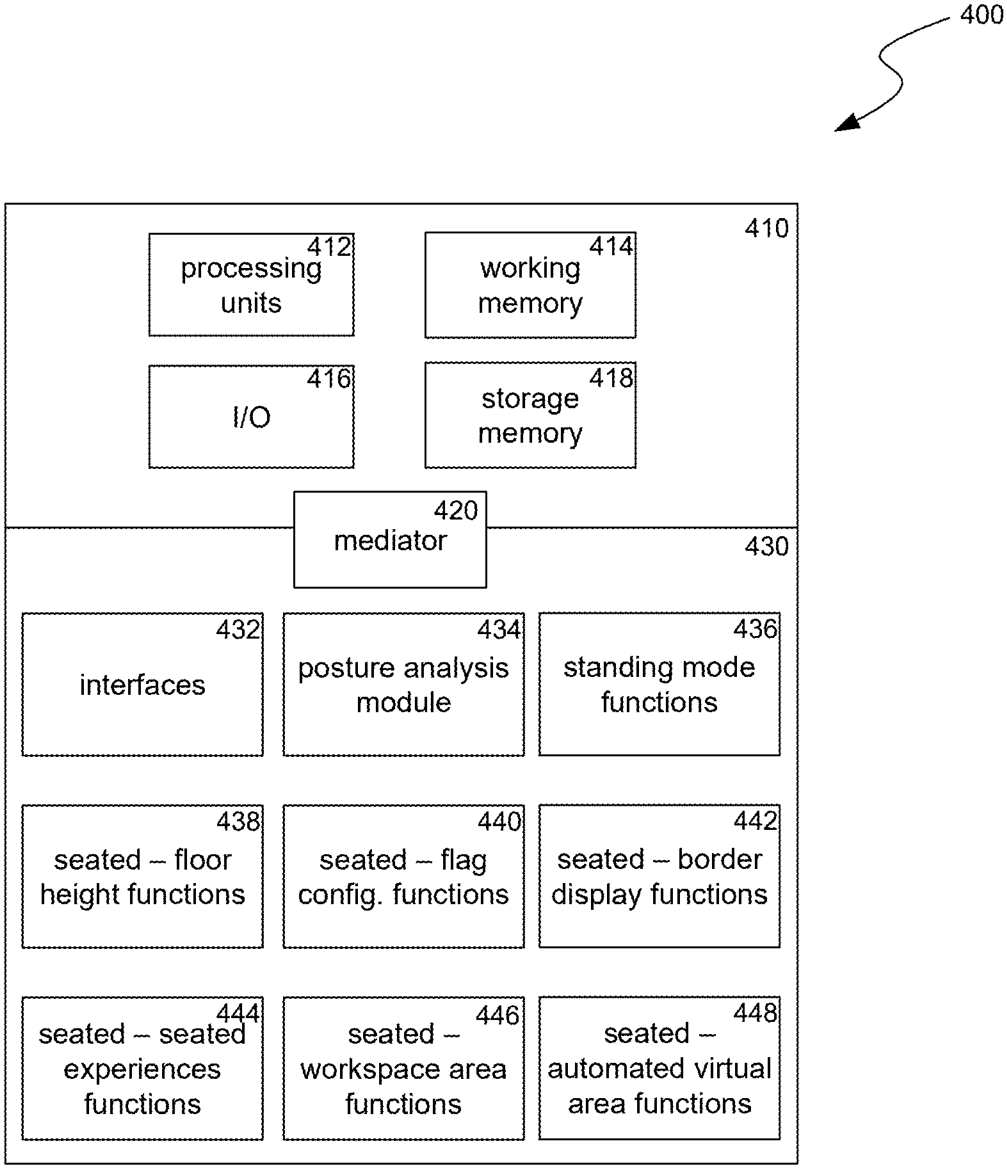
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for customizing a virtual space based on user posture. For example, specialized components 430 can include posture analysis module 434, standing mode functions 436, seated—floor height functions 438, seated—flag configuration functions 440, seated—border display functions 442, seated—seated experience functions 444, seated—workspace area functions 446, seated—automated virtual area functions 448, and components and APIs that can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430.

Posture analysis module 434 can receive sensor input (e.g., images from a camera, position sensor data, controller sensor input, etc.) and/or determined body mechanics models (e.g., a kinematic skeleton model of a user, hand positions, etc.) and use these to determine a posture of the user. In various implementations, a posture can specify if a user is standing, seated, lying down, etc. In some implementations, standing postures can be divided into standing, mobile or standing, stationary, or other movement-based postures. Additional details on determining a user posture are described below in relation to block 502 of FIG. 5.

Some implementations can include standing mode functions 436. In these implementations, the virtual space configuration system can execute these functions in response to posture analysis module 434 identifying a standing posture. Executing standing mode functions 436 can include receiving a user specified boundary for a standing, mobile posture or an automatically sized (based on determined arm-span) cylinder or wineglass shaped boundary for a standing, stationary posture. This boundary can be shown to the user if the system predicts that the user is likely to collide with the boundary. Additional details on standing mode functions are provided below in relation to blocks 506 and 510 of FIG. 5.

Some implementations can include seated—floor height functions 438. In these implementations, the virtual space configuration system can execute these functions in response to posture analysis module 434 identifying a seated posture. Executing seated—floor height functions 438 can include receiving floor height metrics, such as a user selection of floor height, a floor height based on a determined user height, an average of floor heights selected by other users, etc. Seated—floor height functions 438 can use this metric to set a virtual floor height. Additional details on setting a virtual floor height when a user is in a seated posture are provided below in relation to FIGS. 6A and 7A.

Some implementations can include seated—flag configuration functions 440. In these implementations, the virtual space configuration system can execute these functions in response to posture analysis module 434 identifying a seated posture. Executing seated—flag configuration functions 440 can include setting a flag in response to the determination that the user is in a seated posture. This flag can then be surfaced to applications, allowing them to adjust positioning of objects and other mechanics based on whether the flag is set. Additional details on setting a seated flag and surfacing it to allow applications to adjust mechanics are provided below in relation to FIGS. 6B and 7B.

Some implementations can include seated—border display functions 442. In these implementations, the virtual space configuration system can execute these functions in response to posture analysis module 434 identifying a seated posture. Executing seated—border display functions 442 can include determining a virtual space boundary mode such as a pattern, color, or type, where types can be virtual walls, showing objects in passthrough mode, warning messages or other alerts, etc. When the virtual space configuration system detects a boundary display event, such as a prediction that the user will intersect a boundary or a real-world object, or that a real-world object has entered the virtual space, executing the seated—border display functions 442 can further include displaying a boundary or a representation of real-world objects according to the determined virtual space boundary mode. Additional details on selecting a virtual space boundary mode and corresponding display events are provided below in relation to FIGS. 6C and 7C.

Some implementations can include seated—seated experience functions 444. In these implementations, the virtual space configuration system can execute these functions in response to posture analysis module 434 identifying a seated posture. Executing seated—seated experience functions 444 can include detecting a further change in posture while the user is engaging in a seated-only virtual experience. Using a mapping of postures to response actions, e.g., provided by the seated-only virtual experience, a response action for the posture change can be determined and performed. For example, if the user stands up, the application can pause, provide a notification, log that the user was standing, change input modalities, and/or change virtual objects. Additional details on triggering response actions for posture changes are provided below in relation to FIGS. 6D and 7D.

Some implementations can include seated—workspace area functions 446. In these implementations, the virtual space configuration system can execute these functions in response to posture analysis module 434 identifying a seated posture. Executing seated—workspace area functions 446 can include, while a user remains in a seated posture, detecting a further leaning forward posture. In response, execution of the seated—workspace area functions 446 can enable a passthrough display mode for a determined workspace area, allowing the user to see a representation of real-world objects in the workspace area without having to remove a headset or other hardware of the artificial reality system. The workspace area can be determined based on one or more of an area predefined by the user, a determined arm-span of the user, an average of workspaces set by other users, and/or using computer vision and object detection to identify an area such as the top of a desk or an area including various tools such as a keyboard, mouse, and/or monitors. In some implementations, a trained machine learning model can determine the workspace area based on a current context (e.g., user specifics and/or camera input), where the model was trained based on similar input matched to user-selected workspace areas or automatically identified workspace areas determined based on object identification that have high confidence values. Additional details on detecting a leaning-forward, seated posture and displaying a workspace area in passthrough mode are provided below in relation to FIGS. 6E and 7E.

Some implementations can include seated—automated virtual area functions 448. In these implementations, the virtual space configuration system can execute these functions in response to posture analysis module 434 identifying a seated posture. Executing seated—automated virtual area functions 448 can include automatically determining dimensions of a virtual area for a seated position based on one or more of a user defined area, a user arm-span, average areas set by other users, etc. In some implementations, a trained machine learning model can determine the virtual space dimensions based on a current context (e.g., user specifics and/or camera input), where the model was trained based on similar input matched to user-selected virtual spaces. The shape of the virtual area can be automatically determined based on one or more of: a setting in a current application, a user selection, a determined current use for the virtual space with mappings of uses to virtual space shapes, etc. Additional details on automatically determining aspects of a virtual area are provided below in relation to FIGS. 6F and 7F.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
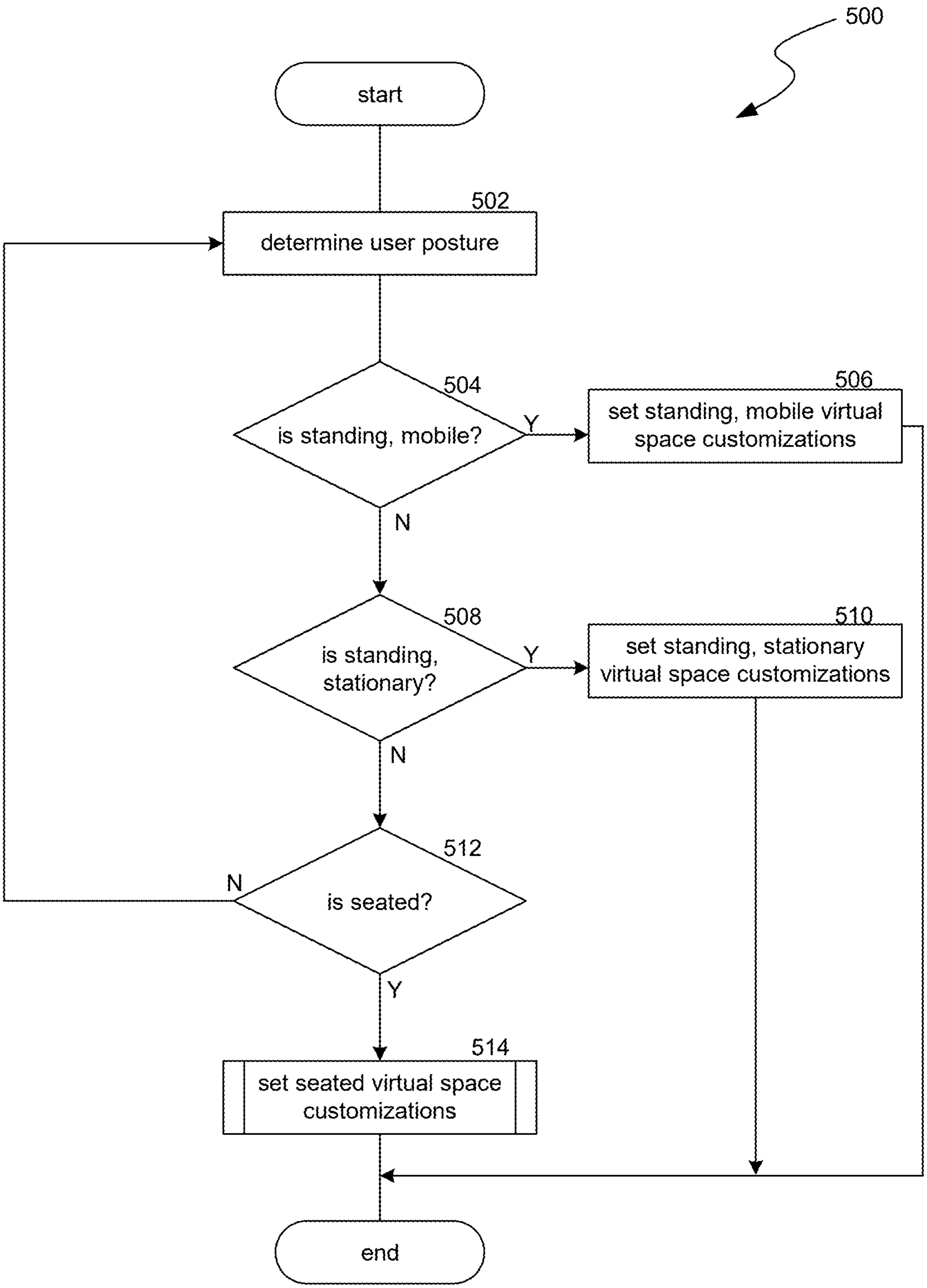
FIG. 5 is a flow diagram illustrating a process used in some implementations of the present technology for setting virtual space configurations based on user posture.

FIG. 5 is a flow diagram illustrating a process 500 used in some implementations of the present technology for setting virtual space configurations based on user posture. In various implementations, process 500 can be performed by an artificial reality system (e.g., by the virtual space configuration sub-system) when the artificial reality system is first turned on, when the artificial reality system detects a user change, continuously on a periodic basis (e.g., every 1-2 seconds), or in response to a detected change in posture (e.g., where the posture detection of block 502 is performed periodically or in response to input signals such as changes in height or other movements of a headset or controllers).

At block 502, process 500 can determine a user posture. A "posture" is a position or configuration of one or more parts of a user's body. For example, a posture can be seated, standing, lying down, having arms outstretched, a particular hand position or gesture, a head orientation, a torso rotation or angle, etc. In some implementations, a posture can also encompass movement—such as a particular motion of one or more body parts and/or motions in relation to a point or object. For example, a first identified posture can be standing stationary while a second identified posture can be standing and has made a threshold level of lateral movements relative to a central point. In various implementations, process 500 can automatically determine a user posture, e.g., based on a determined height of a headset of the artificial reality system, particular detected movements (e.g., of a headset, controller, hand, leg, or other body part), images captured by the artificial reality system, other inputs such as position data, IMU data, etc. In some implementations, various measurements and determinations from the artificial reality system can be supplied to a machine learning model trained to classify a current posture of the user. Determining a user posture (or "pose") is discussed in greater detail in U.S. patent application Ser. No. 16/663,141 titled "Systems and Methods for Generating Dynamic Obstacle Collision Warnings Based On Detecting Poses of Users," filed on Oct. 9, 2019, which is incorporated herein by reference in its entirety. In some implementations, a user posture can be specified by user input or user input can verify an automatically detected posture.

At block 504, process 500 can determine whether the posture determined at block 502 corresponds to a standing mobile posture. A standing mobile posture can indicate that the user is standing and is in a situation where she may move around laterally (as opposed to standing generally in the same spot). This can be indicated by the artificial reality system determining that the user is standing (e.g., based on a determined headset height, user posture selection input, etc.) and one or more of: the user has indicated a border area for the virtual space, the user has specified an intent to move, a current application is designed for being mobile while standing, or a determination that the user has moved laterally at least a threshold amount from a central point (i.e., determining that they have moved from their standing location). When the posture corresponds to standing mobile mode, process 500 can continue to block 506 where it sets standing, mobile virtual space customizations. For example, the virtual space can be a user defined space and/or a space defined to avoid the user colliding with detected objects in the real-world space around the user. The customizations can also include setting display features for showing the boundary if the artificial reality system determines the user is in danger of colliding with it, such as using a very obvious red grid pattern to immediately catch the user's attention. If the posture is not standing mobile, process 500 can continue to block 508.

At block 508, process 500 can determine whether the posture determined at block 502 corresponds to a standing stationary posture. A standing stationary posture can indicate that the user is standing and is unlikely to move around laterally (i.e., is likely to stand within a few feet of the same spot). Similarly to the standing mobile posture, the standing stationary posture can be indicated by the artificial reality system determining that the user is standing (e.g., based on a determined headset height, user posture selection input, etc.). But in this case, the user may have specified an intent not to move, a current application may be designed for being stationary while standing, or the artificial reality system can determine that the user has not moved at least a threshold amount from a central point (i.e., determining that they have not moved laterally a significant amount such as 1-2 feet from their current standing location). When the posture amounts to be standing stationary, process 500 can continue to block 510 where it sets standing stationary virtual space customizations. For example, the virtual space can be a user defined space, or a cylinder or wineglass shape defined around the user. The customizations can also include setting display features for showing the boundary if the artificial reality system determines the user is in danger of colliding with it, such as using an obvious red grid pattern to immediately catch the user's attention or, since such collisions are less likely to create damage, a less intrusive pattern of gray cross (e.g., +) shapes. If the posture is not standing stationary, process 500 can continue to block 512.

At block 512, process 500 can determine whether the posture determined at block 502 corresponds to a seated posture. A seated posture can be indicated by the artificial reality system determining that a headset of the system is a threshold distance from an average seated headset height, can be from a user input specifying a posture, can be determined based on a machine learning model that takes sensor input and classifies a current posture, can be assumed based on a current application being designed for use while seated or from direction provided to the user, or using other metrics. If the determined posture is seated, process 500 can continue to block 514 where any of various seated virtual space customizations can be applied. In various implementations, the available seated virtual space customizations can include allowing adjustment of a floor height (see additional details below in relation to FIG. 6A), setting a flag that can be surfaced to applications to adjust the applications' mechanics (see additional details below in relation to FIG. 6B), customizing display of virtual space boundaries when in seated mode to be less intrusive (see additional details below in relation to FIG. 6C), providing options to detect when a user leaves seated mode and trigger corresponding actions (see additional details below in relation to FIG. 6D), providing a passthrough workspace area allowing a user to interact with certain real-world objects naturally without having to remove an artificial reality headset (see additional details below in relation to FIG. 6E), and automatically determining virtual space dimensions for seated users (see additional details below in relation to FIG. 6F). If the posture is not seated, process 500 can return to block 502 to continue monitoring the user posture for a recognized variant.

Figure 6B:
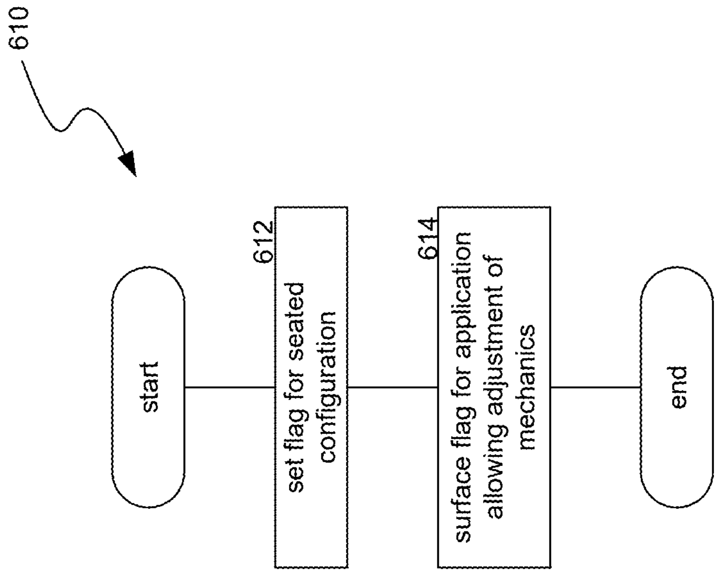
FIG. 6B is a flow diagram illustrating a process used in some implementations for setting a flag to allow applications to adjust mechanics for seated configurations.
Figure 6A:
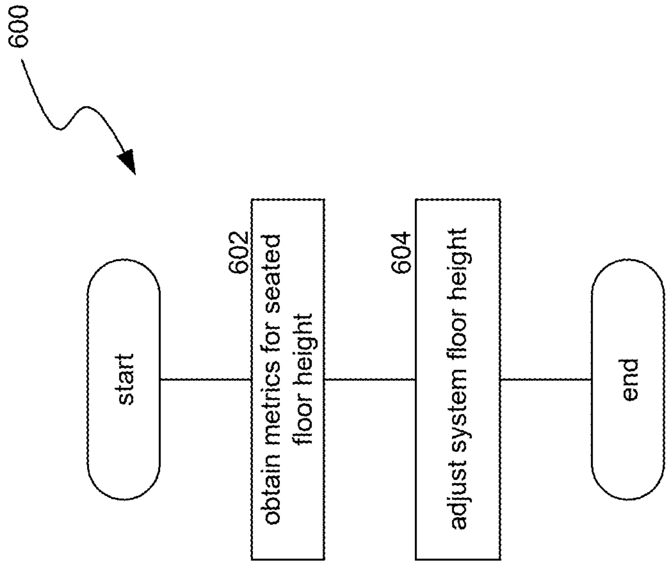
FIG. 6A is a flow diagram illustrating a process used in some implementations for enabling floor height customization when a user is seated.

FIG. 6A is a flow diagram illustrating a process 600 used in some implementations for enabling floor height customization when a user is seated. In some implementations, process 600 can be performed as a sub-process of block 514 of process 500. In some cases, process 600 can be performed in response to other triggers, such as an application changing a posture mode, a user selection, a change in users, the start of a particular application, etc.

At block 602, process 600 can obtain metrics for a seated floor height. The metrics can be determined based on circumstances such as a standing height of the user, a user arm-span, dimensions of a chair, couch or other object the user is seated upon (e.g., determined using computer vision techniques and a camera integrated with the artificial reality system), averages or other statistics of floor heights set by other users (or users determined to be similar to the current user), etc. In some implementations, one or more of these features can be used as input to a machine learning model trained to predict a desired floor height based on previous other user selections. In other implementations, these features can be used in a mapping of features to floor heights. In some implementations, the metric can be a user selected value, e.g., by indicating a floor height with a hand gesture, input to a controller, a voice command, a gaze, etc. In some implementations, the user can be recognized and the obtained metric can be based on a previous selection for that user.

At block 604, process 600 can set a floor height based on the metric obtained at block 602. This sets a minimum height for virtual objects in relation to the user, improving user accessibility when in the virtual space by eliminating instances where the user would otherwise have to move to the edge of a chair or couch and reach the floor. In some implementations, the floor height can be set for the artificial reality system across applications or can be set for a particular application where a different floor height is set for other applications. An example of setting a floor height is discussed below in relation to FIG. 7A.

FIG. 6B is a flow diagram illustrating a process 610 used in some implementations for setting a flag to allow applications to adjust mechanics for seated configurations. In some implementations, process 610 can be performed as a sub-process of block 514 of process 500. In some cases, process 610 can be performed in response to other triggers such as an application changing a posture mode, a user selection, a change in users, the start of a particular application, etc.

At block 612, in response to a determination that the user is in a seated posture (e.g., determined at blocks 502 and 512) process 610 can set a flag indicating the seated posture. A flag can be any type of variable such as a binary value, a posture identifier, a posture name, etc. Setting a flag can include various types of writing to memory, such as setting a program or operating system variable, writing to database field, writing to a file, etc. For example, an operating system for the artificial reality system can maintain a set of operating condition variables, one of which can be a posture indicator or an "isSeated" flag. At block 614, process 610 can surface the flag set at block 612 to an application. For example, the application can send a request to the operating system for a value of the flag, can read from a database where the flag is set, etc. Reading the flag can allow the application to modify certain mechanics to better accommodate seated users. For example, an application can change positioning of virtual objects, moving them within arm's reach, whereas if the user were standing such adjustments may not be necessary as the user could take a step to reach more distant objects, more easily reach objects on the floor, etc. An example of using a flag to allow applications to adjust mechanics for seated configurations is discussed below in relation to FIG. 7B.

Figure 6D:
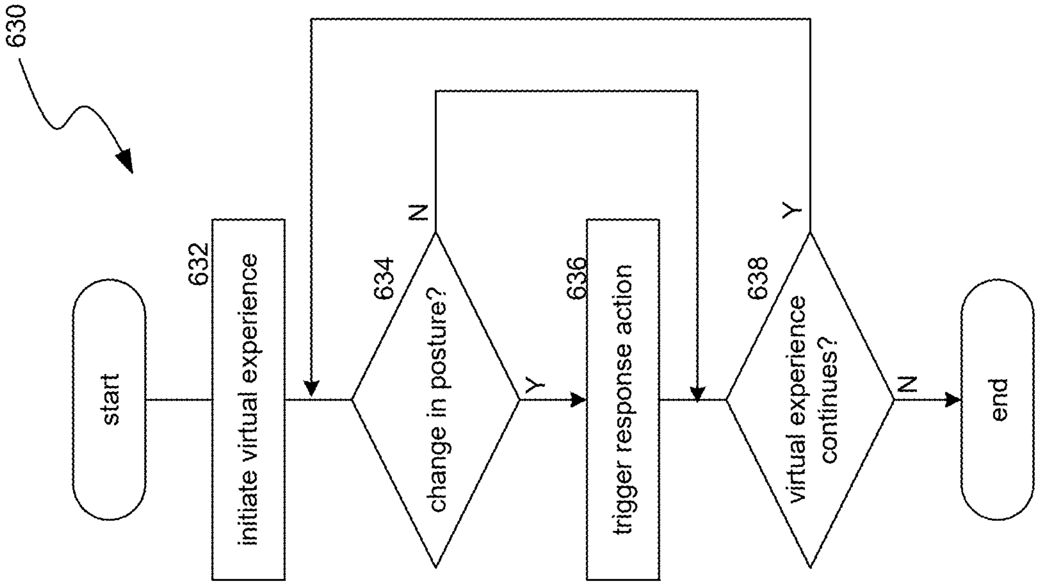
FIG. 6D is a flow diagram illustrating a process used in some implementations for enabling seated-only virtual experiences.
Figure 6C:
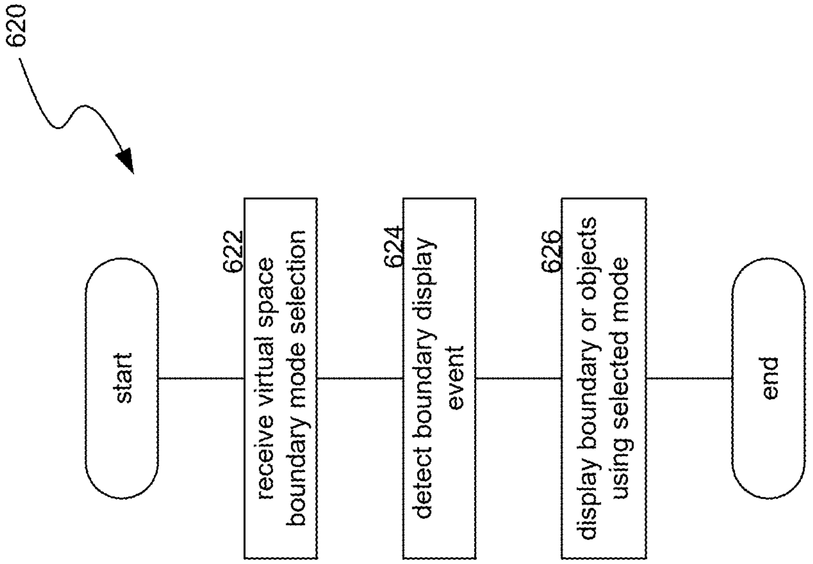
FIG. 6C is a flow diagram illustrating a process used in some implementations for customizing virtual space boundary displays in response to user posture.

FIG. 6C is a flow diagram illustrating a process 620 used in some implementations for customizing virtual space boundary displays in response to user posture. In some implementations, process 620 can be performed as a sub-process of block 514 of process 500. In some cases, process 620 can be performed in response to other triggers such as an application changing a posture mode, a user selection, a change in users, the start of a particular application, etc.

At block 622, process 620 can receive a virtual space boundary display mode selection. In some implementations, this selection can be from a mapping of postures to boundary display modes. For example, when the system detects the user is standing (a circumstance where a user is likely to move around more and also makes faster movements than when seated) a user collision with a boundary is more likely to cause harm. Thus standing postures can be mapped to a boundary display mode that is more likely to cause the user to take notice, such as the boundary appearing as virtual walls of a particular color (e.g., a bright red, green, orange, etc.) and/or with a particular pattern (e.g., a grid, tightly packed dots, flashing lines, etc.). However, when the system detects the user is sitting or lying down (circumstances where a user is likely to less around more and also makes slower movements than when standing) a user collision with a boundary is less likely to cause harm. Thus seated or lying down postures can be mapped to a boundary display mode that is less likely to intrude on the user's artificial reality experience, such as the boundary appearing in less bright colors (e.g., gray, tan, brown, etc.) and/or with a particular pattern (e.g., a grid where only the +s at line intersections are shown, dispersed dots, muted lines, etc.). In some implementations, for seated or lying down postures, the selected boundary display mode can be to show real-world objects as a passthrough to a virtual environment. In such a passthrough mode, if the artificial reality system determines a user is approaching a boundary or is about to collide with an object, the artificial reality system can show, in the virtual space, the real-world objects, allowing the user to identify and avoid them. In some implementations, real-world objects shown in such a passthrough mode can be muted or shown as just shadows to avoid taking the user too far out of her virtual experience.

At block 624, process 620 can detect a boundary display event. This can occur by detecting that a user is within a threshold distance of a boundary, that a determined trajectory of a user is expected to intersect with a boundary, and/or that a user's body position and configuration (e.g., arm or leg span, stride length, height, movement profile, etc.) makes it likely the user will intersect with the boundary. In some implementations, a machine learning model can be trained to make this determination. For example, input to the machine learning model can include inertia, position, camera, and/or other sensor input from a headset and/or controllers of the artificial reality system, a model of the user's body (e.g., bone structure), past movement data of the user or of average users, border configuration specifics, etc. The machine learning model can be trained to produce a prediction of whether the user is likely to intersect with the boundary (e.g., trained based on previous identifications of context when a user intersected with a boundary). In some implementations, there can be other triggers for displaying a boundary, such as another person or object entering the virtual space, which may cause a change in the boundary or enabling of a passthrough mode or a current application signaling for the boundary to be displayed.

At block 626, process 620 can, in response to the detected boundary display event of block 624, display the boundary or objects in the surrounding area (i.e., enable passthrough mode) using the selected virtual space boundary display mode selected at block 622. For example, process 620 can show a virtual wall or portion of a virtual wall that has a specified pattern and/or color, can shown objects within a threshold distance of the user or with which the artificial reality system demines the user is likely to collide, can show a virtual wall or objects that fade corresponding to their distance to the user, etc. An example of customizing virtual space boundary displays to show the boundary in passthrough when the user is in a seated posture is discussed below in relation to FIG. 7C.

FIG. 6D is a flow diagram illustrating a process 630 used in some implementations for enabling posture-specific virtual experiences. In some implementations, process 630 can be performed as a sub-process of block 514 of process 500. In some cases, process 630 can be performed in response to other triggers such as an application changing a posture mode, a user selection, a change in users, the start of a particular application, etc.

At block 632, process 630 can initialize a virtual experience designed to be performed in a current posture. For example, an application can be set to be used in a seated-only posture, a standing-only posture, a lying-down-only posture, etc. As more specific examples, a company may specify for a training program that the user should be seated throughout the training program, otherwise the program should pause; a game could be configured to have a first input modality (e.g., a stationary virtual control board) when the user is seated and a different input modality (e.g., based on monitored user movements) if the user is standing; an application developer may want to tune usage of her application to a most common user posture and thus may gather statistics on aggregate user postures; etc.

At block 634, process 630 can detect if there has been a change in user posture. This can occur in a similar manner to block 502. In some implementations, only certain specified changes in posture will trigger the Yes (Y) branch from block 634. For example, while process 630 could detect various changes in posture such as arm positions or torso tilt, a current application can specify that only changes from a seated to a standing posture or a change of a lateral movement above a threshold distance should trigger the Yes branch. In various implementations, an operating system for the artificial reality system or an application being run by the artificial reality system can specify certain mappings between posture changes and response actions, and it can be these mapped posture changes that trigger the Yes branch from block 634. If no such posture change is detected (the No (N) branch), process 630 can continue to block 638. If such posture change is detected (the Yes branch), process 630 can continue to block 636.

At block 636, in response to the detected posture change at block 634, process 630 can trigger a response action. In some implementations, there can be a response action set by the artificial reality system, such as automatically stopping or pausing the virtual experience, providing a notification to resume a previous posture or that the current posture is not recommended for this experience, logging times at which various postures are held, switching to another mode (e.g., a passthrough mode), etc. In some implementations, the current application can specify one or more mappings of a trigger action to perform for particular posture changes. For example, an application can specify that, if a user stands up from a sitting posture, a notification to return to a seated position should be displayed and time standing should be logged, and if the time standing exceeds a threshold the virtual experience should pause. As another example, a game application can specify that when the user is in a seated posture the virtual experience should be driving a virtual car but if the user stands up the virtual experience should change to show exiting the virtual car and transitioning to a virtual walking mode.

At block 638, process 630 can determine whether the virtual experience initiated at block 632 is still in progress. Process 630 can monitor postures and trigger response actions while the virtual experience is continuing. Once the virtual experience ends, process 630 can also end. An example of enabling posture-specific virtual experiences is discussed below in relation to FIG. 7D.

Figure 6F:
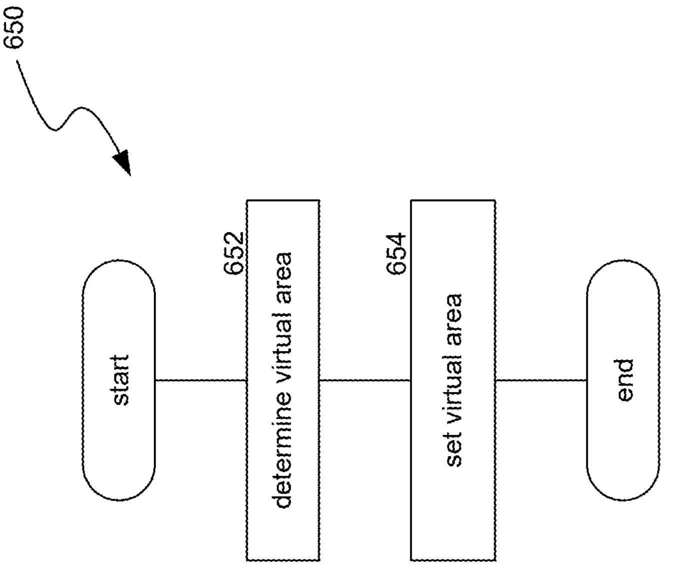
FIG. 6F is a flow diagram illustrating a process used in some implementations for automatically customizing a virtual area in seated mode.
Figure 6E:
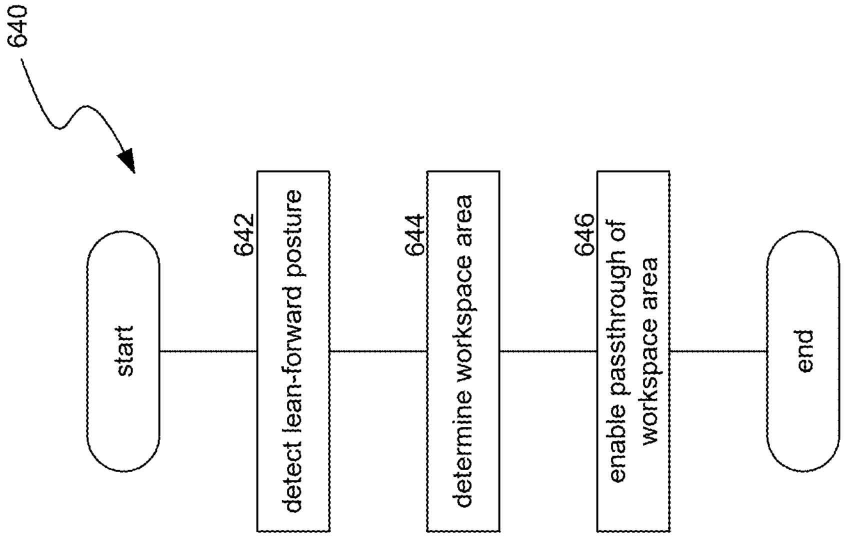
FIG. 6E is a flow diagram illustrating a process used in some implementations for enabling a seated workspace virtual area.

FIG. 6E is a flow diagram illustrating a process 640 used in some implementations for enabling a seated workspace virtual area. In some implementations, process 640 can be performed as a sub-process of block 514 of process 500. In some cases, process 640 can be performed in response to other triggers such as an application changing a posture mode, a user selection, a change in users, the start of a particular application, etc.

At block 642, process 640 can detect, while the user maintains a seated posture, a lean-forward posture. This can be a lean forward of a threshold number of degrees from a vertical, e.g., by 10, 15, or 20 degrees. In some implementations, other postures can be detected for triggering a workspace area, such as arms raised and hands poised for a virtual keyboard or forearms resting on a desk.

At block 644, process 640 can determine a workspace area. For example, this can be an area pre-established by the user; an area of a set size and shape (e.g., a three foot by four foot rectangle); an area defined based on characteristics of the user (e.g., a semicircle or rectangle with a size based on a determined arm-span of the user, such as an area fully in reach of the user); an area corresponding to arm-spans of average users, users with characteristics such as height similar to a current user, or an average of areas manually set by other users; or an area based on computer vision/object recognition (e.g., an area corresponding to a top of a desk in front of the user or an area enclosing tools for a user such as a keyboard, notebooks, or monitors); etc. In various implementations, this area can be established in response to the posture detected at block 642 or can be previously established.

At block 646, process 640 can enable a passthrough display mode for the determined workspace area. As discussed above, a passthrough mode can show parts of the real-world while in an artificial reality environment. For example, images taken by external cameras can be fed into the artificial reality environment, a part of a display can be disabled allowing light passing through the display to be seen by the user, part of a display can be moved to allow light to enter the user's eye, etc. By enabling passthrough mode for the determined workspace area upon detecting a certain posture, the user can easily interact with tools and other objects in the workspace area without having to remove a headset of the artificial reality system or manually enable passthrough mode. An example of enabling passthrough for a workspace virtual area when a user is seated and leans forward is discussed below in relation to FIG. 7E.

FIG. 6F is a flow diagram illustrating a process 650 used in some implementations for automatically customizing a virtual area in seated mode. In some implementations, process 650 can be performed as a sub-process of block 514 of process 500. In some cases, process 650 can be performed in response to other triggers such as an application changing a posture mode, a user selection, a change in users, the start of a particular application, etc.

At block 652, process 650 can automatically determine an area for a virtual space for a user in a seated posture. Process 650 can use a pre-established shape for the area, such as a cylinder centered on the user, a half cylinder in front of the user, a cuboid, or others. The dimensions of the area can be set based on, e.g., a setting specified by user input, a determined user arm-span, statistics about the general arm-span of users or users identified as similar to the current user, an identification of real-world objects the artificial reality system identifies to exclude from the virtual space, or identifications of virtual objects the artificial reality system identifies to include in the virtual space. For example, process 650 can determine the virtual area as the half-cylinder in front of the user with a radius equal to half the user's arm-span (i.e., the length of one arm). As another example, process 650 can determine the virtual area to be a cube in front of the user that excludes all real-world objects in that area. In some implementations, the determined virtual area can be suggested to the user, who can manually adjust its parameters or define a different virtual area, e.g., with a different size, shape, or activation features.

In some implementations, a user's arm-span can be determined by setting the arm-span to be equal to the user's height. In some cases, this setting can be updated based on identifying a user's hands or controller locations and extending the determined arm-span if the distance of the identified hands or controllers extends beyond the determined arm-span. In other cases, the arm-span can be contracted if the identified hands or controllers never extend to the determined arm-span within a threshold amount of time or usage amount of the artificial reality system. In some implementations, instead of starting with an initial height determination, arm-span can be determined directly by observing these hand or controller distances. In some implementations, the arm-span determination can be determined or adjusted by identifying, in images of the user, the user's arms and using a body movement model (e.g., a kinematic skeleton model) to project a maximum reach.

At block 654, process 650 can set the virtual area determined at block 652. In various implementations, this virtual area can be set globally, for all instances where the current user is identified, for use when running a particular application, or for use during a particular task. An example of automatically setting virtual space dimensions is discussed below in relation to FIG. 7F.

Figure 7A:
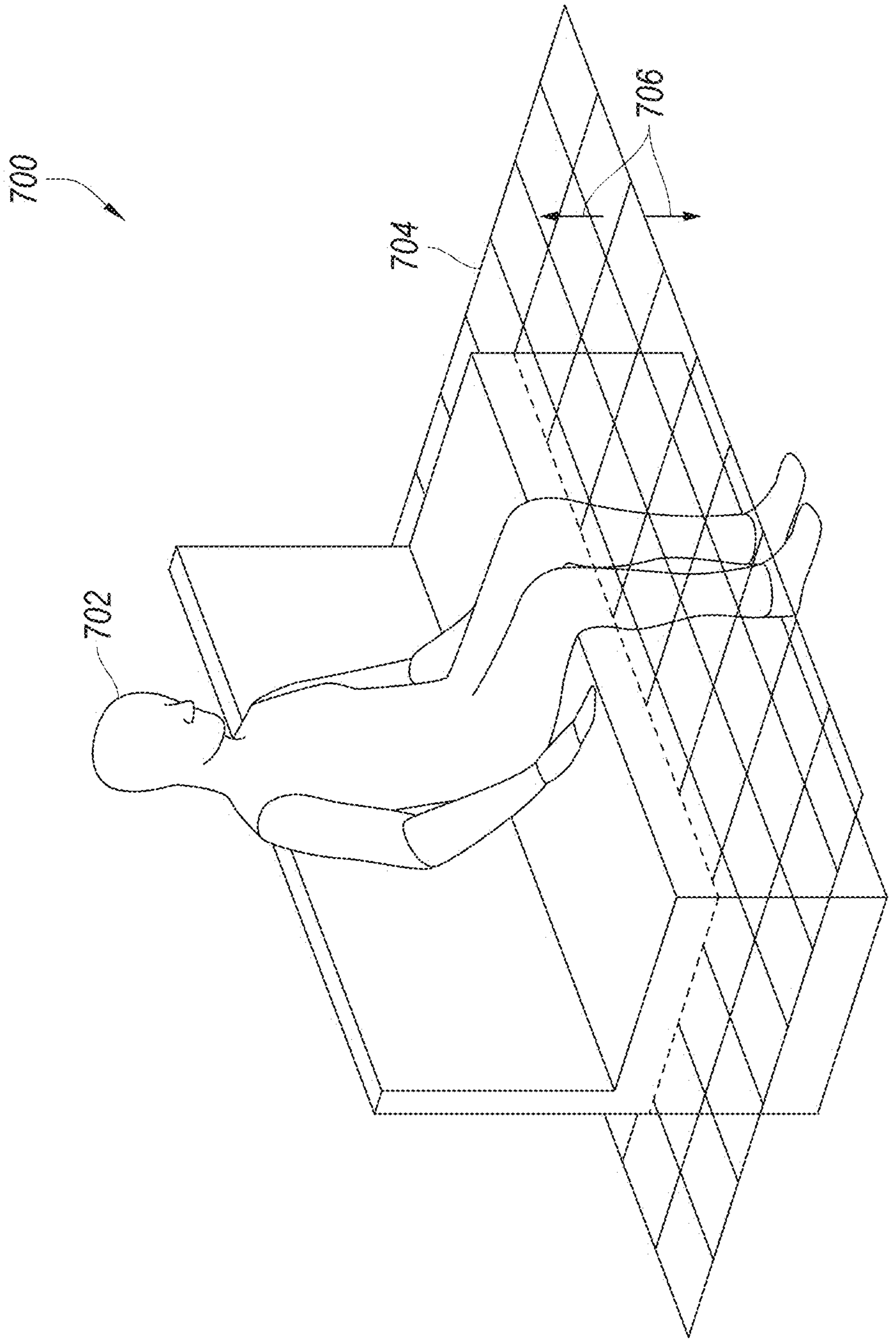
FIG. 7A is a conceptual diagram illustrating an example of enabling floor height customization when a user is seated.

FIG. 7A is a conceptual diagram illustrating an example 700 used in some implementations for enabling floor height customization when a user is seated. In example 700, the virtual space configuration system has determined that a user 702 is in a seated posture. In response, the virtual space configuration system has enabled an option for the user 702 to adjust a height of a virtual floor 704. As shown by arrows 706, the user 702 can activate controls (e.g., virtual controls shown in the artificial reality environment, controls on a controller, using her gaze, etc.) to adjust the height of the virtual floor 704. The height of the virtual floor 704 can cause applications to place objects no lower than that virtual floor 704. As shown in example 700, by raising the virtual floor 704, the user 702, while seated, can much more easily reach any objects placed on the virtual floor 704.

Figure 7B:
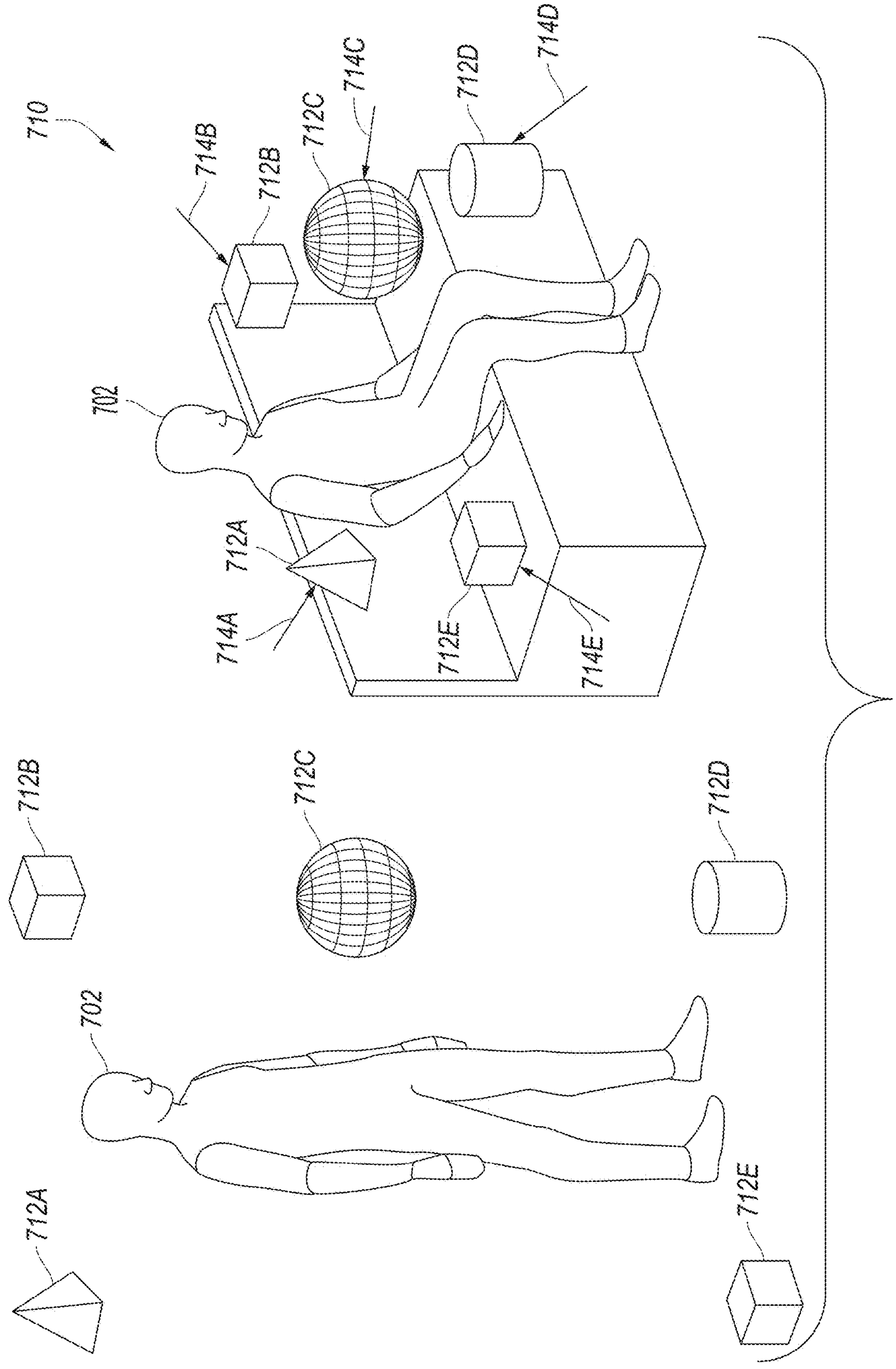
FIG. 7B is a conceptual diagram illustrating an example of using a flag to allow applications to adjust mechanics for seated use configurations.

FIG. 7B is a conceptual diagram illustrating an example 710 used in some implementations for using a flag to allow applications to adjust mechanics for seated use configurations. In example 710, user 702 is initially standing, surrounded by objects 712A-E. When the virtual space configuration system detects a posture change that the user 702 is now seated, the virtual space configuration system sets a seated flag, which is surfaced to the application in control of objects 712. The application can adjust the position of objects 712 (as shown by arrows 714A-E) to be within reach of the seated user 702.

Figure 7C:
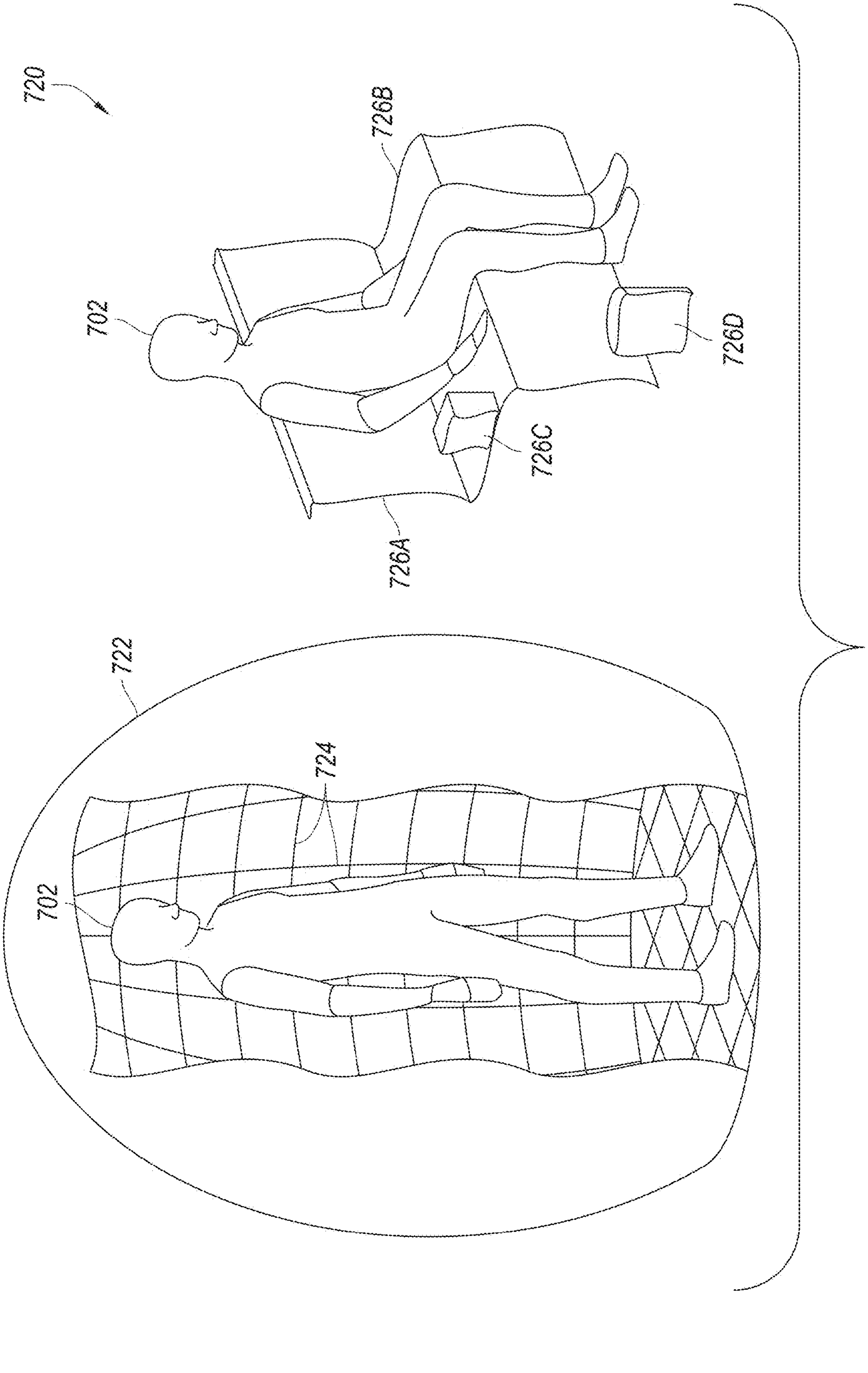
FIG. 7C is a conceptual diagram illustrating an example of customizing virtual space boundary displays in response to user posture.

FIG. 7C is a conceptual diagram illustrating an example 720 used in some implementations for customizing virtual space boundary displays in response to user posture. Example 720 first shows user 702 in a standing posture where virtual space 722 has a boundary wall with portions of the boundary wall appearing when the user 702 is within a threshold distance of that portion. The boundary wall is configured with a virtual space boundary display mode selection that causes a red grid pattern, e.g., lines 724, to display on the wall. In the second part of example 720, user 702 has adopted a seated posture. At this point, the virtual space boundary display mode changes for the virtual space such that real-world objects within a threshold distance of the user 702 are shown in a passthrough mode. In example 720, these objects are cut off at lines 726A-D, showing where they are no longer within the threshold distance of the user 702.

Figure 7D:
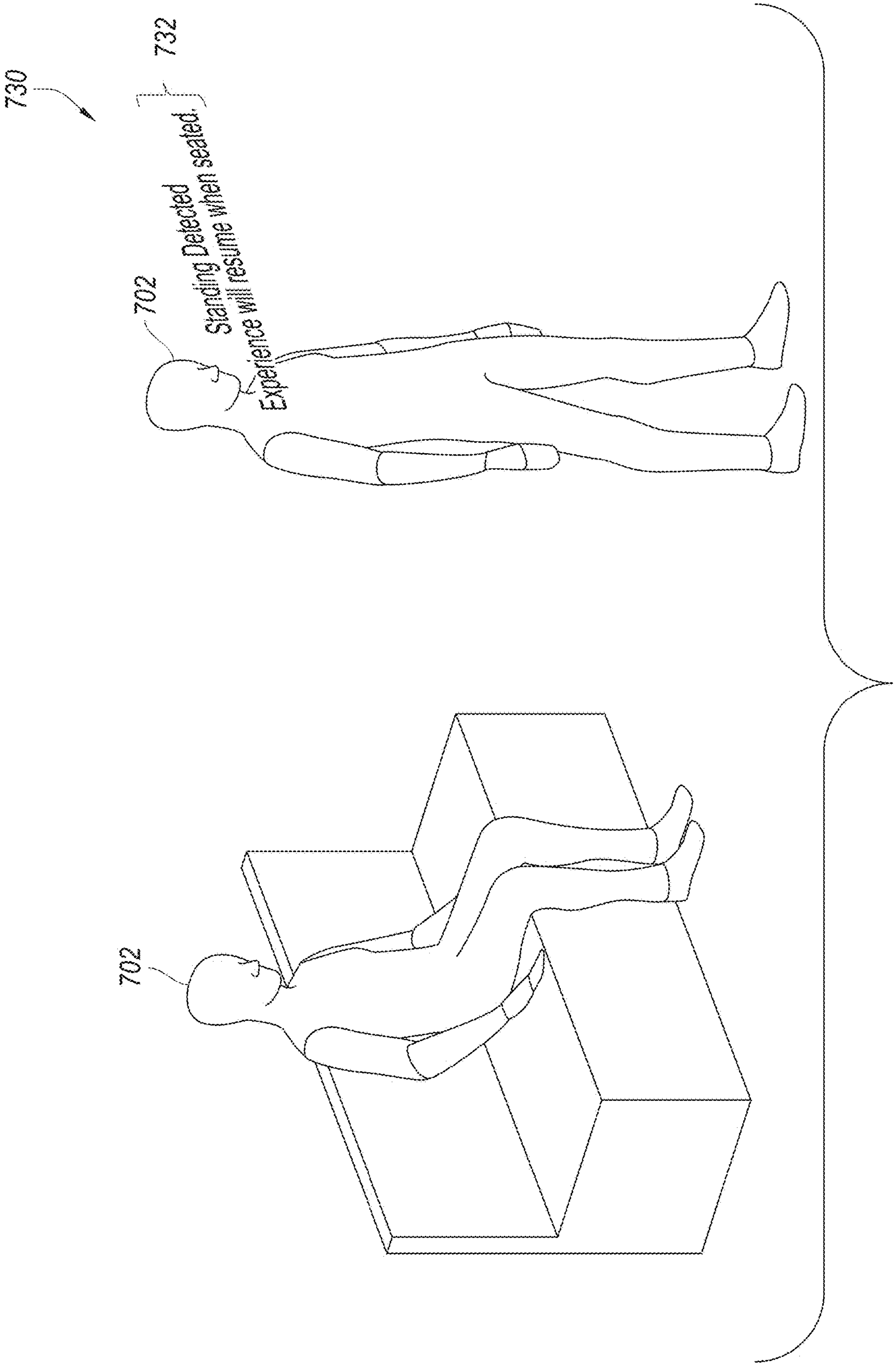
FIG. 7D is a conceptual diagram illustrating an example of enabling seated-only virtual experiences.

FIG. 7D is a conceptual diagram illustrating an example 730 used in some implementations for enabling seated only virtual experiences. In example 730, user 702 is initially in a seated position while the virtual space configuration system executes a seated-only virtual experience. When the user 702 transitions to a standing posture, the virtual space configuration system pauses the seated-only virtual experience and displays message 732 informing the user 702 that the seated-only virtual experience will resume when the user 702 returns to a seated posture.

Figure 7E:
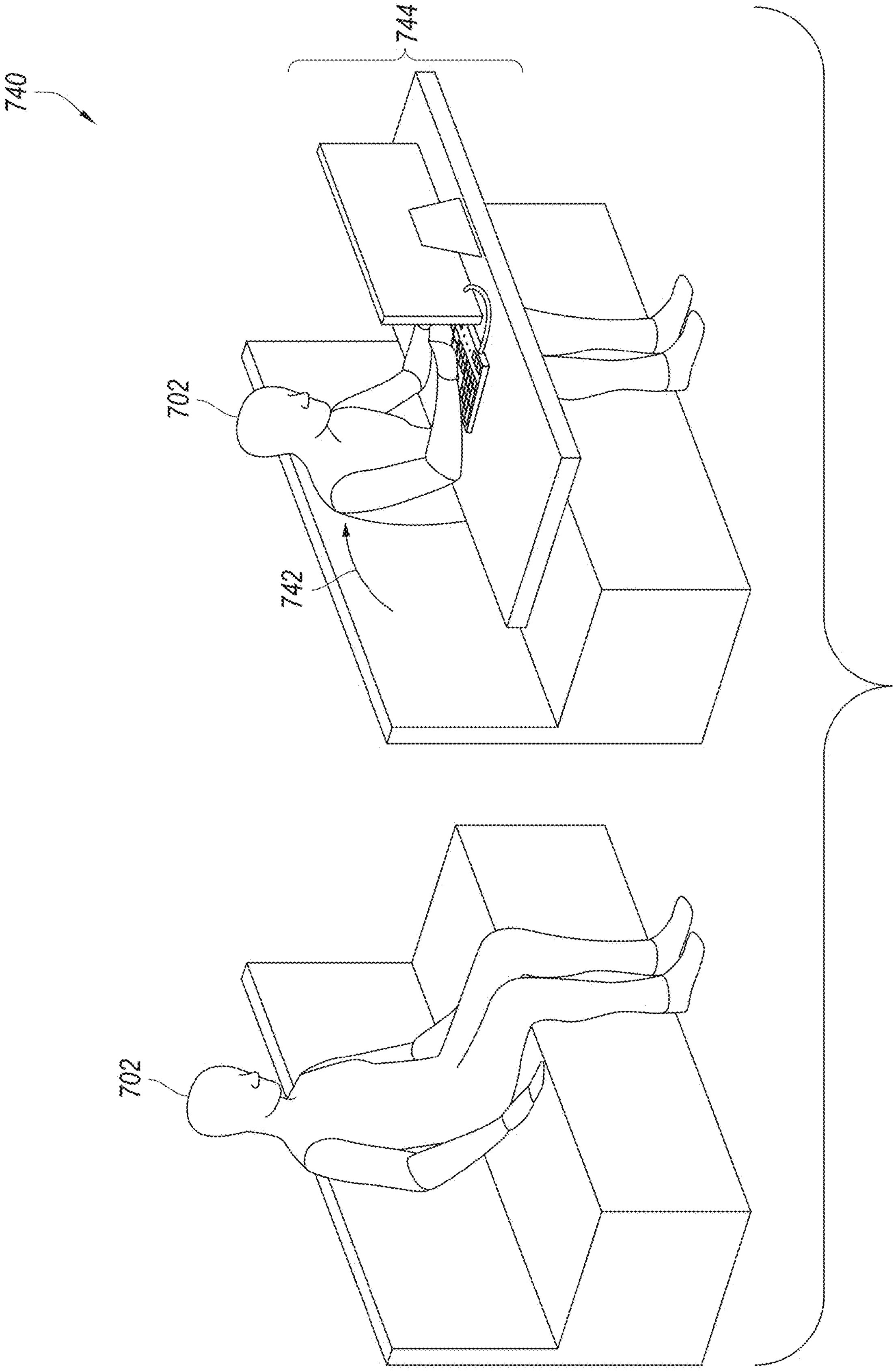
FIG. 7E is a conceptual diagram illustrating an example of enabling a seated workspace virtual area.

FIG. 7E is a conceptual diagram illustrating an example 740 used in some implementations for enabling a seated workspace virtual area. In example 740, user 702 begins by being in a seated, upright posture. As indicated by arrow 742, user 702 then leans forward while remaining seated. In response to detecting this seated, leaning forward posture, the virtual space configuration system displays a workspace area 744, which is an area the virtual space configuration system has identified as corresponding to a surface of a desk in front of the user containing a keyboard and monitor.

Figure 7F:
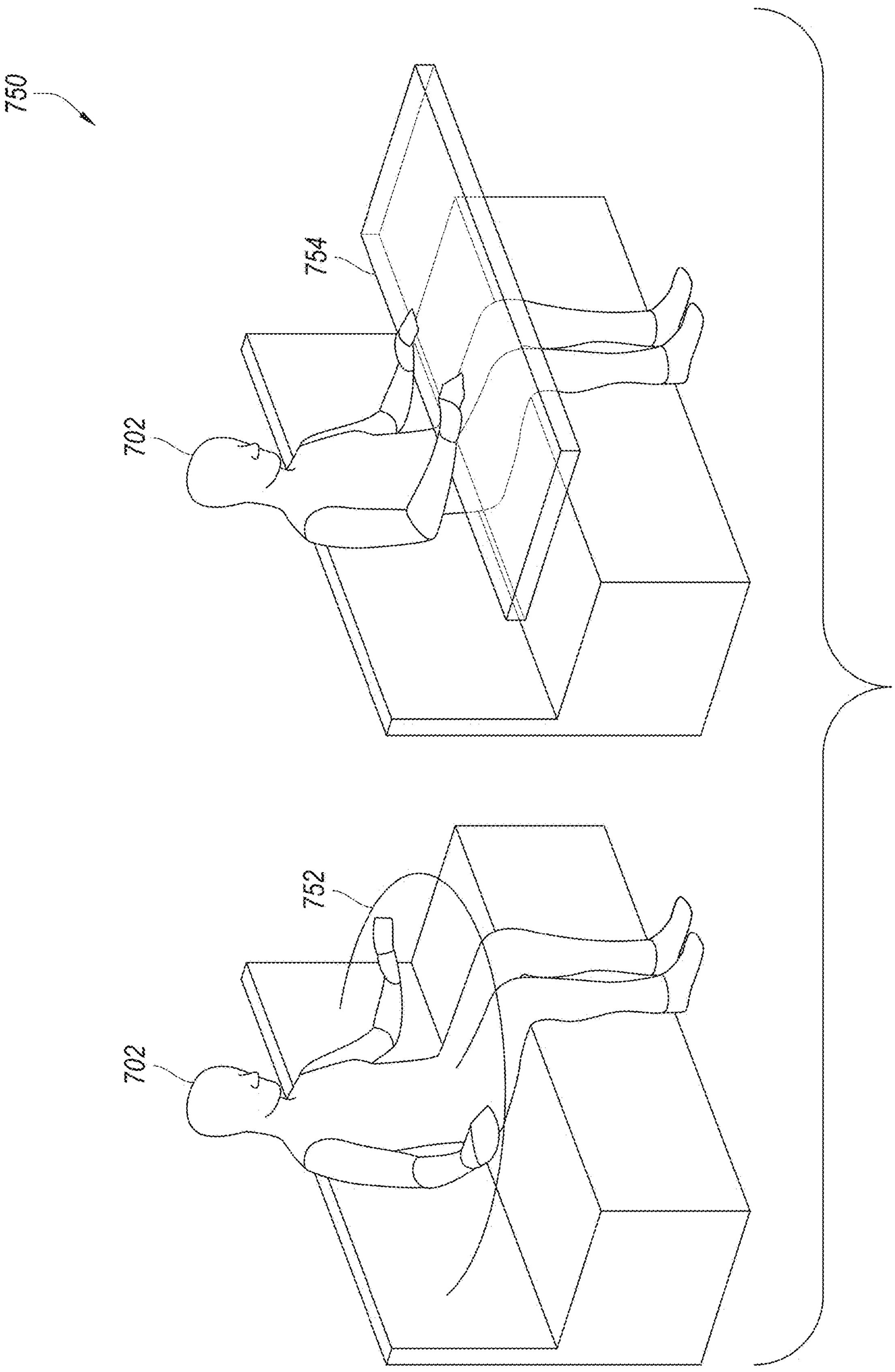
FIG. 7F is a conceptual diagram illustrating an example of automatically customizing a virtual area in seated mode.

FIG. 7F is a conceptual diagram illustrating an example 750 used in some implementations for automatically customizing a virtual area in seated mode. Example 750 shows a first instance where the virtual space configuration system automatically determines the size 752 of a virtual space, configured to be a half cylinder in front of the user 702, based on a determine arm-span of the user 702. Example 750 also shows a second instance where the virtual space is a cuboid in front of the user 702 with length and width dimensions 754 set based on statistical averages of areas selected by other users with a user height within a threshold of the height of user 702.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for providing a virtual experience to a user of an artificial-reality headset, the method comprising:
- detecting a first posture of the user wearing the artificial-reality headset, wherein the first posture comprises a position of the user's torso;
- determining positions of one or more virtual objects within the virtual experience around the user while the user is in the first posture;
- detecting a change in the user's posture; and
- in accordance with a determination that the change in posture of the user changes from the first posture to a second posture, automatically, without user input directed to moving the one or more virtual objects, adjusting the positions of the one or more virtual objects within the virtual experience such that each respective virtual object moves from a first position within the virtual experience to a second position within the virtual experience, wherein:
  - the second posture different from the first posture and comprises another position of the user's torso.

2. The method of claim 1, wherein each respective virtual object in the second position is within reach of the user in the virtual experience.

3. The method of claim 1, wherein the first position of each respective virtual object is a first distance away with respect to the user and the second position of each respective virtual object is a second distance away with respect to the user.

4. The method of claim 3, wherein the first distance is larger than the second distance.

5. The method of claim 1, wherein the method further includes:
- detecting another change in the user's posture; and
- in accordance with a determination that the other change in posture of the user changes from the second posture to a third posture, the third posture different from the first posture and the second posture, adjusting the positions of the one or more virtual objects within the artificial-reality headset such that each respective virtual object moves from the second position within the virtual experience to a third position within the virtual experience around the user.

6. The method of claim 1, wherein the method further includes:
- detecting another change in the user's posture; and
- in accordance with a determination that the other change in posture of the user changes from the second posture to a third posture, the third posture different from the first posture and the second posture, pausing the virtual experience and generating an indication to the user to return to the first posture or the second posture.

7. The method of claim 6, wherein the method further includes:
- detecting an additional change in the user's posture; and
- in accordance with a determination that the additional change in posture of the user changes from the third posture to the first or second posture, activating the virtual experience.

8. The method of claim 1, wherein the method further includes:
- before detecting the change in the user's posture and while the user is in the first posture, displaying the virtual experience with a first point of view; and
- after detecting the second posture, displaying the virtual experience with a second point of view.

9. The method of claim 1, wherein the first posture and the second posture include the user standing up and sitting down.

10. An artificial-reality headset configured to provide a virtual experience to a user, comprising:
- one or more processors; and
- one or more programs, wherein the one or more programs are stored in memory and configured to be executed by the one or more processors, the one or more programs including instructions for:
  - detecting a first posture of the user wearing the artificial-reality headset, wherein the first posture comprises a position of the user's torso;
  - determining positions of one or more virtual objects within the virtual experience around the user while the user is in the first posture;
  - detecting a change in the user's posture; and
  - in accordance with a determination that the change in posture of the user changes from the first posture to a second posture, automatically, without user input directed to moving the one or more virtual objects, adjusting the positions of the one or more virtual objects within the virtual experience such that each respective virtual object moves from a first position within the virtual experience to a second position within the virtual experience, wherein:
    - the second posture different from the first posture and comprises another position of the user's torso.

11. The artificial-reality headset of claim 10, wherein the first position of each respective virtual object is a first distance away with respect to the user and the second position of each respective virtual object is a second distance away with respect to the user.

12. The artificial-reality headset of claim 10, wherein the one or more programs further include instructions for:

detecting another change in the user's posture; and in accordance with a determination that the other change in posture of the user changes from the second posture to a third posture, the third posture different from the first posture and the second posture, adjusting the positions of the one or more virtual objects within the artificial-reality headset such that each respective virtual object moves from the second position within the virtual experience to a third position within the virtual experience around the user.

13. The artificial-reality headset of claim 10, wherein the one or more programs further include instructions for:

detecting another change in the user's posture; and in accordance with a determination that the other change in posture of the user changes from the second posture to a third posture, the third posture different from the first posture and the second posture, pausing the virtual experience and generating an indication to the user to return to the first posture or the second posture.

14. The artificial-reality headset of claim 13, wherein the one or more programs further include instructions for:

detecting an additional change in the user's posture; and in accordance with a determination that the additional change in posture of the user changes from the third posture to the first or second posture, activating the virtual experience.

15. The artificial-reality headset of claim 10, wherein the one or more programs further include instructions for:

before detecting the change in the user's posture and while the user is in the first posture, displaying the virtual experience with a first point of view; and after detecting the second posture, displaying the virtual experience with a second point of view.

16. A non-transitory computer readable storage medium including instructions that, when executed by a computing device, cause the computing device to:

detect a first posture of a user wearing an artificial-reality headset, wherein the artificial-reality headset provides a virtual experience to the user and the first posture comprises a position of the user's torso;

determine positions of one or more virtual objects within the virtual experience around the user while the user is in the first posture;

detect a change in the user's posture; and in accordance with a determination that the change in posture of the user changes from the first posture to a second posture, automatically, without user input directed to moving the one or more virtual objects, adjust the positions of the one or more virtual objects within the virtual experience such that each respective virtual object moves from a first position within the virtual experience to a second position within the virtual experience, wherein:

the second posture different from the first posture and comprises another position of the user's torso.

17. The non-transitory computer readable storage medium of claim 16, further including instructions that cause the computing device to:

detect another change in the user's posture; and in accordance with a determination that the other change in posture of the user changes from the second posture to a third posture, the third posture different from the first posture and the second posture, adjust the positions of the one or more virtual objects within the artificial-reality headset such that each respective virtual object moves from the second position within the virtual experience to a third position within the virtual experience around the user.

18. The non-transitory computer readable storage medium of claim 16, further including instructions that cause the computing device to:

detect another change in the user's posture; and in accordance with a determination that the other change in posture of the user changes from the second posture to a third posture, the third posture different from the first posture and the second posture, pause the virtual experience and generate an indication to the user to return to the first posture or the second posture.

19. The non-transitory computer readable storage medium of claim 18, further including instructions that cause the computing device to:

detect an additional change in the user's posture; and in accordance with a determination that the additional change in posture of the user changes from the third posture to the first or second posture, activate the virtual experience.

20. The non-transitory computer readable storage medium of claim 18, further including instructions that cause the computing device to:

before detecting the change in the user's posture and while the user is in the first posture, display the virtual experience with a first point of view; and after detecting the second posture, display the virtual experience with a second point of view.

* * * * *